(12) United States Patent
Friedberg

(10) Patent No.: US 12,298,535 B2
(45) Date of Patent: May 13, 2025

(54) SEQUIN SYSTEM AND METHOD

(71) Applicant: Martin F Friedberg, Rosemont, IL (US)

(72) Inventor: Martin F Friedberg, Rosemont, IL (US)

( * ) Notice: Subject to any disclaimer, the term of this patent is extended or adjusted under 35 U.S.C. 154(b) by 211 days.

(21) Appl. No.: 16/350,387

(22) Filed: Aug. 23, 2014

(65) Prior Publication Data
US 2020/0183178 A1    Jun. 11, 2020

(51) Int. Cl.
| | |
|---|---|
| *G02B 30/27* | (2020.01) |
| *A41D 27/08* | (2006.01) |
| *D05B 3/12* | (2006.01) |
| *D05C 7/08* | (2006.01) |
| *G02B 3/00* | (2006.01) |
| *G09F 19/12* | (2006.01) |

(52) U.S. Cl.
CPC ............ *G02B 30/27* (2020.01); *A41D 27/08* (2013.01); *D05B 3/12* (2013.01); *D05C 7/08* (2013.01); *G02B 3/005* (2013.01); *G09F 19/12* (2013.01); *D05D 2303/18* (2013.01)

(58) Field of Classification Search
CPC ........ G02B 30/27; G02B 3/005; A41D 27/08; D05B 3/12; G09F 19/12; D05D 2303/18
See application file for complete search history.

(56) References Cited

U.S. PATENT DOCUMENTS

| | | | |
|---|---|---|---|
| 4,765,265 A | 8/1988 | Brownbill et al. | |
| 6,301,044 B1 | 10/2001 | Huber et al. | |
| 6,454,895 B1 | 9/2002 | Weder | |
| 7,293,512 B2 | 11/2007 | Tajima et al. | |
| 7,364,314 B2 | 4/2008 | Nilsen | |
| 2003/0016370 A1 | 1/2003 | Goggins | |
| 2005/0111210 A1 | 5/2005 | Ono | |
| 2006/0164923 A1 | 7/2006 | Feister | |
| 2006/0250695 A1* | 11/2006 | Welch | A41D 27/085 359/516 |
| 2007/0199490 A1 | 8/2007 | Suzuki | |
| 2009/0061123 A1* | 3/2009 | Mahoney | B41M 5/40 101/493 |
| 2010/0154103 A1* | 6/2010 | Swarovski | A44C 17/04 2/244 |
| 2010/0207945 A1 | 8/2010 | Kirsch | |
| 2012/0019771 A1* | 1/2012 | Goodson | A41D 27/08 351/158 |
| 2012/0045605 A1 | 2/2012 | Collins | |

(Continued)

FOREIGN PATENT DOCUMENTS

CN          203472387 U   *   3/2014

OTHER PUBLICATIONS

"3D Lenticular Fabric Sheets" (Lenticular Fabric sheets—Multicolor: Red, Yellow, Green, Black (lantorlimited.com), via Internet Wayback Machine Lenticular Fabric sheets—Multicolor: Red, Yellow, Green, Black (archive.org); Sep. 20, 2013). (Year: 2013).*

(Continued)

*Primary Examiner* — Laura C Powers
(74) *Attorney, Agent, or Firm* — Robert L Protheroe

(57) ABSTRACT

An ornamental sequin system including a selected visual adaptation provided in a visual plane of at least one sequin to form an ornamental sequin system surface of interlaced colors or images is set forth.

22 Claims, 28 Drawing Sheets

(56) References Cited

U.S. PATENT DOCUMENTS

2012/0170129 A1    7/2012  Balian
2021/0045605 A1*   2/2021  Conrad .................... A47L 9/16

OTHER PUBLICATIONS

RowLux 3D pattern, RowlLux Moire Pattern, RowLux Seaglass Pattern, RowLux Serpentine Pattner Technical Datasheets.*
Viewing Angle Definition Wikipedia.*
Angle of Incidence definition Wikipedia.*
CN203472387I Machine Translation via EPO.*
ISR—WO2015027234-PAMPH-20151105-4606—International Search Report in Counterpart PCT WO2015027234 Application.
WO—WO2015027234-WOSA-20150921-5450—Written Opinion in Counterpart PCT WO2015027234 Application.
02921939—May 5, 2020—Examiner Requisition—in Counterpart Canadian CA 2921939 Application.
02921939—Apr. 8, 2021—Examiner Requisition—in Counterpart Canadian CA 2921939 Application.
02921939—Apr. 11, 2022—Examiner Requisition—in Counterpart Canadian CA 2921939 Application.
02921939—May 3, 2023—Examiner Requisition—in Counterpart Canadian CA 2921939 Application.
02921939—Aug. 8, 2024—Examiner Requisition—in Counterpart Canadian CA 2921939 Application.

* cited by examiner

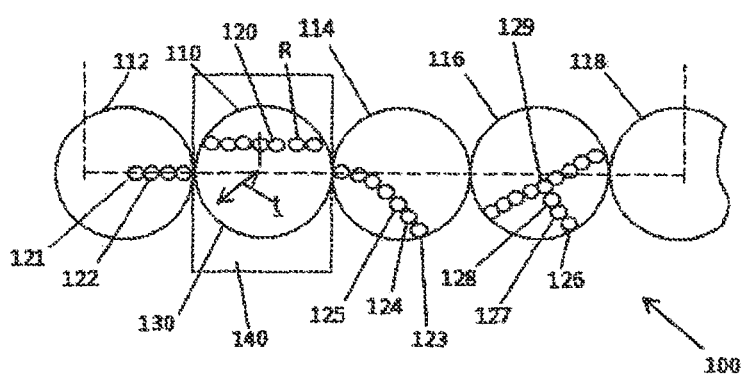
FIG. 1
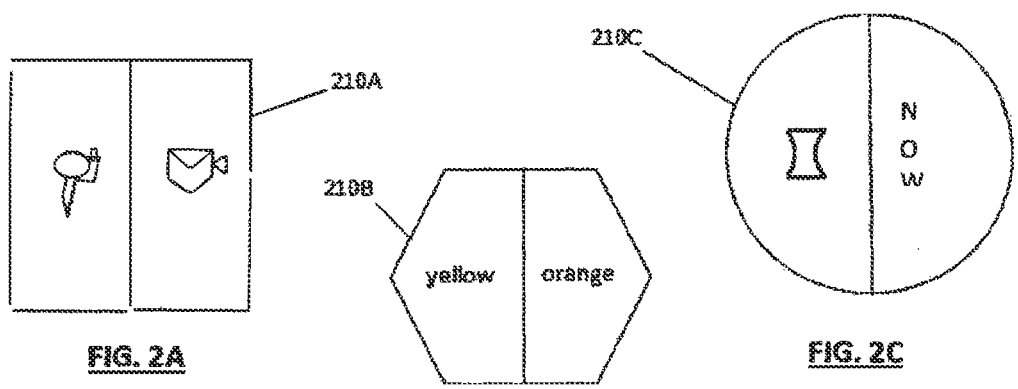
FIG. 2A
FIG. 2B
FIG. 2C
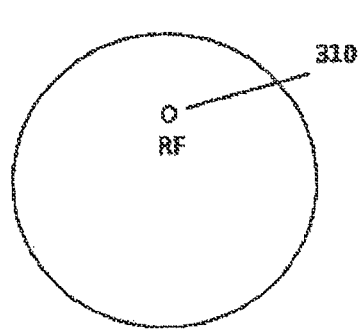
FIG. 3A
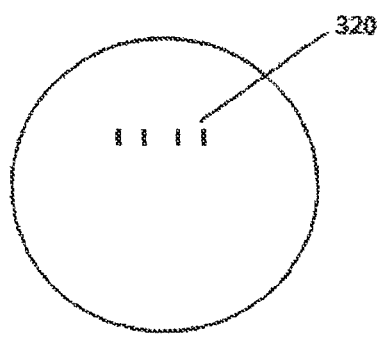
FIG. 3B

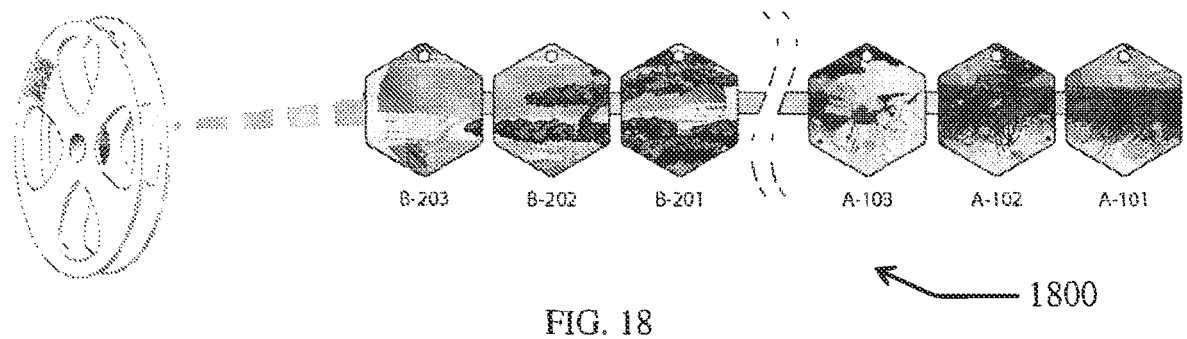
FIG. 18    1800
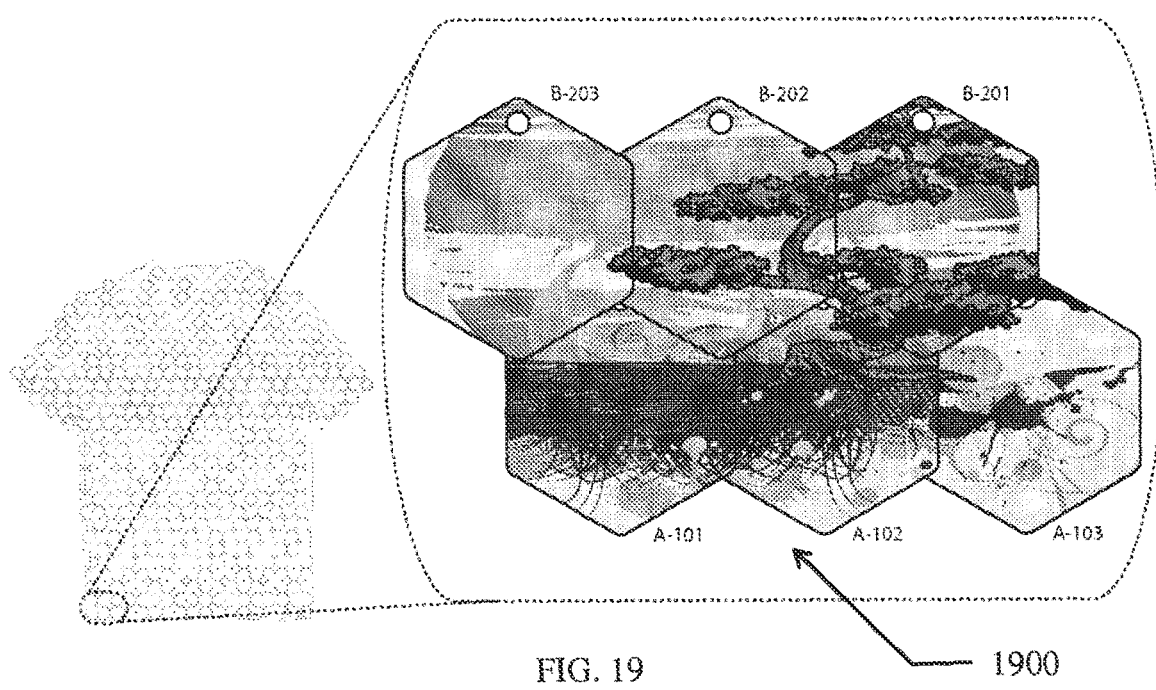
FIG. 19    1900

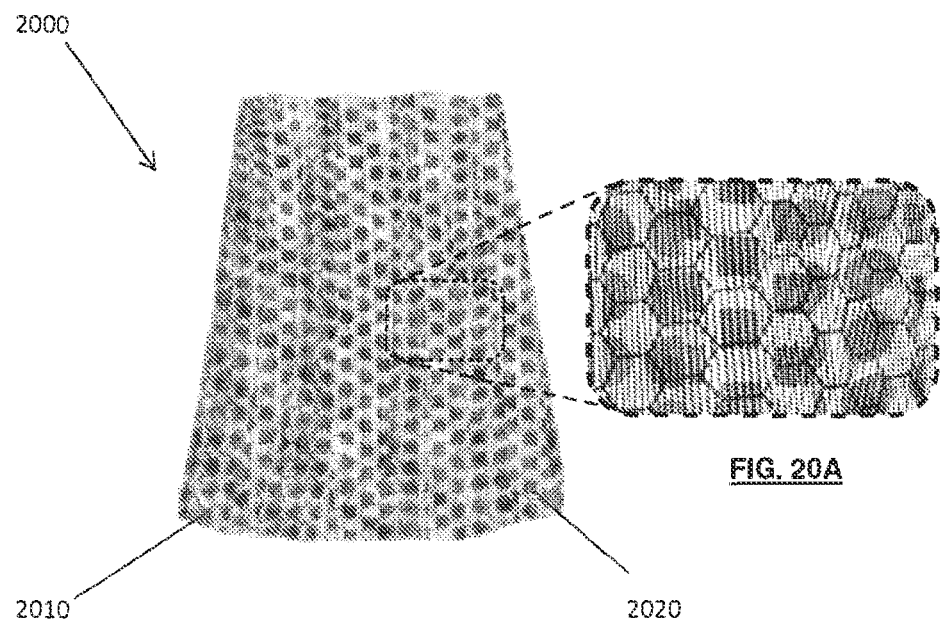
FIG. 20
FIG. 20A
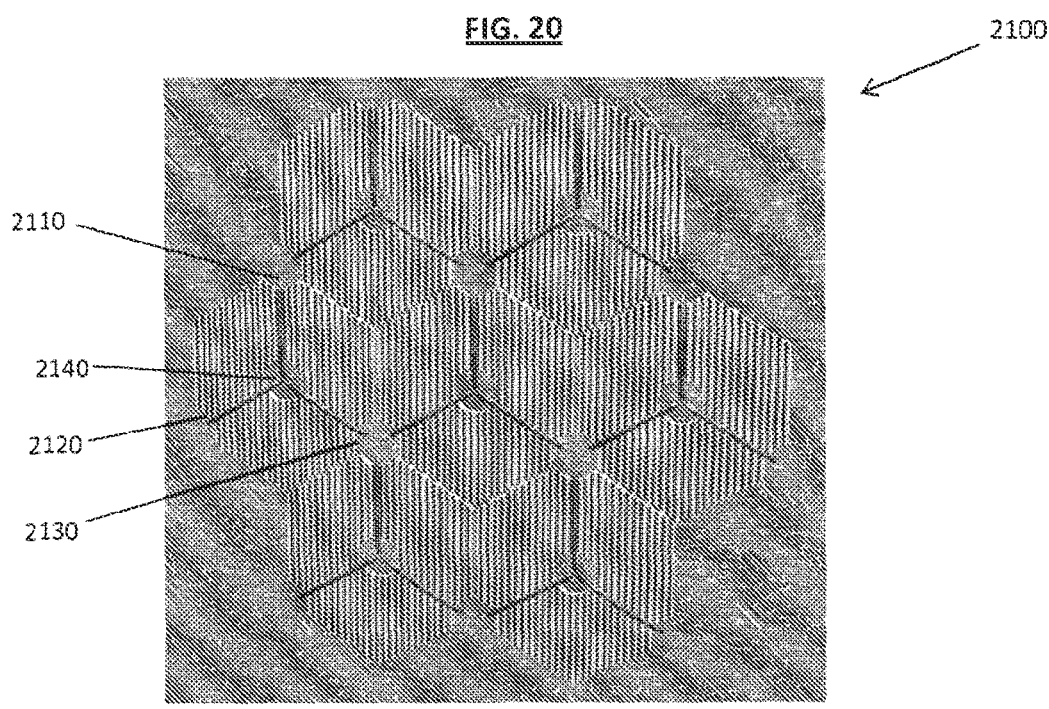
FIG. 21

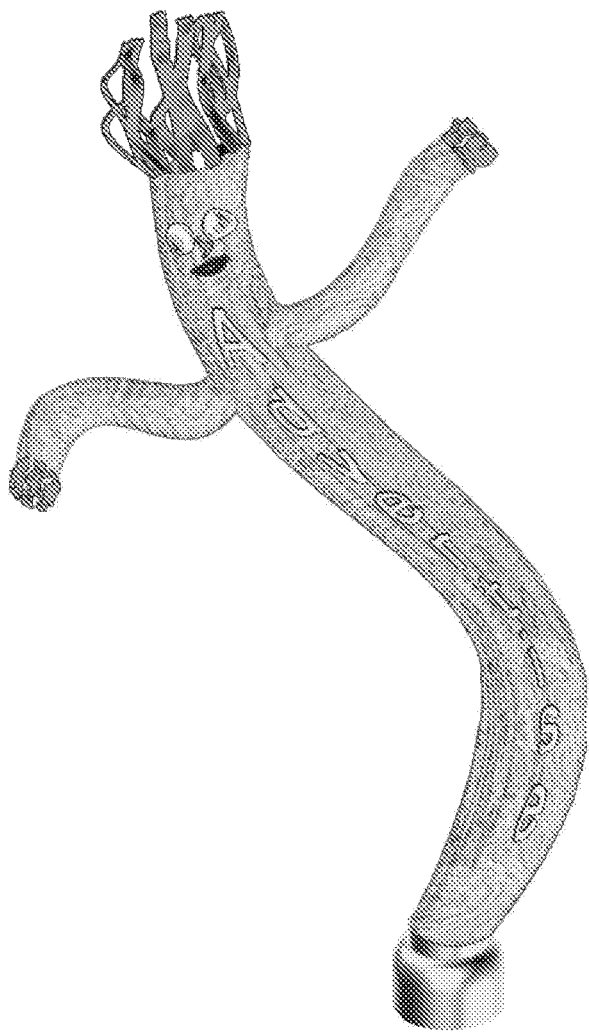
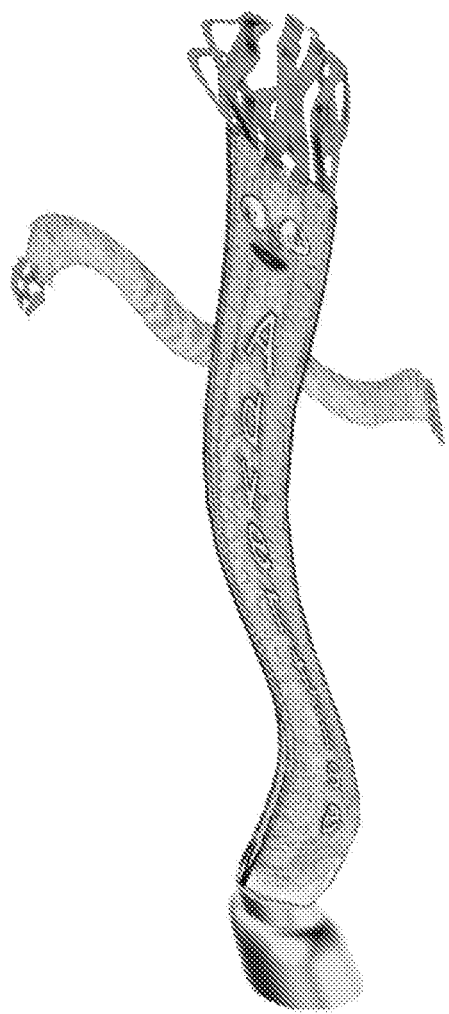
Fig. 32A
Fig. 32B

SEQUIN SYSTEM AND METHOD

STATEMENT OF RELATED CASES

This application incorporates by reference herein in their entirety the following applications: U.S. Ser. No. 13/975,268 filed Aug. 23, 2013, and co-filed applications PCT/US14/52428, U.S. Ser. No. 14/467,005, U.S. 62/041,075, U.S. 62/041,073, U.S. 62/041,076 co-filed with the present application on Aug. 23, 2014.

TECHNICAL FIELD

The present disclosure relates to an ornamental sequin system and method. More particularly, the disclosure relates to a sequin system having multi-view and color variable visual effects, and methodology for applying sequins to form an ornamental arrangement.

BACKGROUND

Historically, the wealthy have used various methods to display their status. One ancient method of displaying wealth involved the sewing of gold, sequin-like discs onto garments. Such discs exist, for example, on the ancient Egyptian garments contained in King Tut's tomb, discovered in 1922. Although the contents of King Tut's tomb, which dazzled the world, included many other artifacts of his riches and symbols of power, the sequins, or spangles, sewn onto his clothing both endure and continue to exhibit his wealth to all those who gaze upon them.

Herbert Lieberman more recently developed acetate sequins. Acetate sequins look beautiful, but form a brittle, fragile decoration. Further improvement was achieved when DuPont invented Mylar in 1952, which was used to surround the sequins to increase durability.

Mylar-acetate sequins became less common with the introduction of vinyl plastic sequins. Vinyl plastic sequins proved more durable and cost effective than Mylar-acetate sequins.

Sequined garments and accessories remain in high demand in modern commerce. Consequently, numerous modern efforts to improve the decorative effect and ease of application of sequins to garments are represented in the patent literature. For example, U.S. Pat. No. 6,301,044 to Huber et al. discusses a system for producing a visual effect at a surface of stage apparel, including: a latent image projector which projects light comprising polarizer-encoded latent visual information, such as a color and/or an image, enabling the visual effect, the light being projected along a light path onto the apparel and reflected therefrom toward a viewer along the light path.

Further, U.S. Pat. No. 6,454,895 to Weder discusses a process for producing a holographic material wherein the holographic image is formed on a polished, substantially smooth surface of a printing element and then transferred the holographic image to a substrate.

Holographic images do not provide the same qualities of appearance as does printing. Further, if you cut a substrate with a holographic image, each part of the substrate contains the entire image. As a result, a mosaic of an image cannot be created by cutting the substrate into parts when using holographic images.

To facilitate applying the sequins to garments, U.S. Pat. No. 4,756,265 to Brownbill et al. discusses an embroidery and applique machine having a number of article feeding modules, each adapted to supply articles such as sequins which are to be appliqued in alignment with a needle. U.S. Pat. No. 7,293,512 to Tajima et al. discusses a feeding mechanism that feeds a plurality of continuous sequin strips which are supplied in an overlapped state, a predetermined pitch at a time to a sewing mechanism while keeping the continuous sequin strips in the overlapped state. U.S. Patent Application number 2007/0199490 to Suzuki discusses a jump code inserted into embroidery data at a position where a shift is to be made from sequin sewing to ordinary sewing or from ordinary sewing to sequin sewing.

Despite the advantages purported to be offered, known sequin systems and application methods exhibit numerous shortcomings. For the foregoing reasons, there is a need for improved decorative sequins and sequin application methods that enhance the advantages of modern sequins and application mechanisms.

SUMMARY

Embodiments of the present disclosure relate to an exemplary ornamental sequin system including a non-holographic lensed display formed in a visual plane of at least one sequin to produce an ornamental sequin system having unique outputs. Examples of suitable non-holographic lensed displays can include, but are not limited to, lenticular lens, parallax barrier, volumetric display, auto-stereoscopic and various light field displays. The outputs are not limited to stereo outputs. The ornamental surface of the sequin system can be formed on a surface of the at least one sequin, or in a visual plane of the sequin surface.

The non-holographic lensed display can further include a preselected lenticular lens integrated with or forming at least one sequin.

The sequin system can include a plurality of sequins. The sequin system can further include a visual animation display, color display, other visual effect, or a combination of visual effects formed using the preselected lenticular lens over interlaced colors or images.

Further features may be employed to constrain the relative rotational alignment of sequin elements, once applied to a target designated surface or finished work, and even during use. For example, the sequin attachment point can be well above its center of gravity, which will allow it to dangle and swing, but will generally be in alignment when motion ceases. Multiple attachment points for each sequin element can also be employed.

The ornamental sequin system can be formed with visual adjustments for the geometric shape of the at least one sequin and an information device attached to the at least one sequin for providing the position of attachment of the at least one sequin within a design scheme, or adjusted to accommodate a size variation or any other suitable design constraint.

The information device can include, for example, a machine-readable identifier, radio frequency, bit flag enumerator, bit array, binary number, or any other suitable readable or transferable code that can render the position for the sequin within the desired design based on garment size, sequin size, or any other suitable variable.

One difficulty associated with producing ornamental elements by printing methods where portions of the sheet of sequin base material are removed when individual or groups of elements are formed from the printing sheet is the loss of information incurred when portions are removed, whether such a sheet is substantially continuous, such as a roll (or reel), or otherwise.

In accordance with the principles herein, an information device can be incorporated into or associated with the printed elements from which the at least one sequin is formed to provide proper orientation on a finished work, while other visual adaptations can be adjusted within the design for the process prior to printing the design upon a sequin base material, for example a roll or a sheet. As a result, a roll incorporating a design to be formed, for example by punching or otherwise cutting, and subsequently reassembled on a finished product can produce beautiful visual effects with the incorporation of the information device by providing an adjustment for the information included on an individual element, or sequin, defined from or upon the sequin base material.

Furthermore, registration information can be incorporated along with the printing pattern and used to guide the forming process so that imagery contained on individual elements are accurately isolated or perhaps even removed from the surrounding sequin base material.

In an embodiment, the ornamental sequin system can include a suitable target designated surface. The ornamental sequin system can be adapted and configured for attachment to the target designated surface. For example, the target designated surface can include target surfaces to which sequins can be applied for a decorative effect such as, for example, a garment.

In yet another embodiment, the ornamental sequin system can include at least one sequin, wherein a portion of the sequin is transparent.

An exemplary method in accordance with the principles herein can include the following steps. First, a sheet or roll of sequin base material containing visual effect information is produced. Next, sequin base material is formed from the sheet to make a plurality of sequins, the plurality of sequins containing both visual and positional information required to comprise and place them into an ornamental arrangement, such that the plurality of sequins are adapted for application to a target designated surface.

Thus, the ornamental appearance of the plurality of sequins, such as for example, a visual effect providing dynamic change between two or more colors, each visible from one or more distinct angles of view, a color flip, which may be applied in placement groupings, interspersed among others, or otherwise arranged to create a myriad of decorative designs, provides different visual information for the design as compared to an additional embodiment that comprises at least one mosaic formed by the plurality of sequins, which constitute a cumulative ornamental arrangement for the design. In this latter embodiment, each sequin contains a specified portion of the overall imagery or design corresponding to its positional placement within a mosaic of sequins. Such a mosaic of sequins can display any suitable visual depiction such as a pattern, an image, text, a montage, a motif, or any combination of depictions. This mosaic embodiment, when further enhanced with multi-view and color variable visual effects, in accordance with the principles herein, results in yet another embodiment that provides a dynamic aesthetic. This may include, for example, an arrangement that morphs from a checkered pattern to polka dots, and perhaps even into a hound's-tooth pattern. Alternatively, or in combination, the depictions so displayed may exhibit size and or color variations. Furthermore, since such a plurality of sequins may be applied upon a flexible finished work, for example a fabric, they may conform to a bending contour and hence provide different viewing angles for different portions of the surface as viewed from any given vantage point.

Since micro-lens arrays, or lenticular lens system, can cause different sets of graphic interlacings to become visible from different viewing angles, various aspects of the multi-view and color variable visual effects are observable on various portions of any such finished work simultaneously. Whenever the finished work surface flexes and bends ripple across its expanse, such as the undulation of a flowing skirt, various aspects of the visual effect will fluctuate accordingly with exquisite eye-catching effect.

In an embodiment, the method can include the step of feeding the sheet onto an anvil whereupon a row or group of sequins can be formed with their respective adjacency predetermined by position. This may occur above, or the resulting set conveyed above, an expanse of a target designated surface, such as, for example, fabric as to allow attachment thereupon. Elasticity would allow for stretching the fabric expanse outwardly during the attachment process. This can be advantageous because doing so allows sufficient space for processing to occur while conversely when the tension is relaxed, the surface area of the expanse reduces back to normal size and thus the sequins will come closer in proximity to one another, allowing their visual aspects to further coalesce.

In yet another embodiment, the method can further include the step of forming a connected series of sequins using a conventional punching machine.

A punching process can form the perimeter edges of the ornamental surface of the sequins of the system disclosed. The punching process can include a conventional punching machine applied to a lenticular sheet of sequin base material, or a punching process applied to the sheet as it is fed over an anvil, punched, and deposited onto a target designated surface, such as a fabric, or any other suitable method of preparing sequins formed in the lenticular sheet of sequin base material for attachment to achieve a visual effect.

Other envisioned alternatives to the use of a preformed lenticular material include forging, etching, molding, extrusion, lamination, additive manufacture, or any suitable method of imparting a lenticular surface onto one or more sequins, whether prior, during, or after formation by any suitable action.

In an embodiment, the information required to form the ornamental arrangement can be contained in an information device within or upon at least one sequin of the ornamental sequin system. In yet another embodiment, an apparatus that applies the sequins to a target designated surface, such as a fabric or garment, accesses encoded information either by reading or by receiving transmitted data. In any case, the information may consist of an internet or intranet address from which the required data is to be obtained.

In an embodiment, a sequin can be formed by the exemplary method. A sequin formed by the exemplary method can include visual effects produced by a lenticular lens, an interlaced color array, image, or any combination of visual components containing visual content.

The foregoing and other features and advantages of the present disclosure will become further apparent from the following detailed description of exemplary embodiments constructed in accordance with the principles herein, read in conjunction with the accompanying drawings. The drawings are not to scale. The detailed description and drawings are merely illustrative of the principles of the present disclosure rather than limiting, the scope of the present disclosure being defined by the appended claims and equivalents thereof.

BRIEF DESCRIPTION OF THE DRAWINGS

FIG. 1 is a top view of an exemplary embodiment of an ornamental sequin system constructed in accordance with the principles herein;

FIGS. 2A, 2B and 2C are each a top view of other embodiments constructed in accordance with the principles herein, wherein sequins contain varied lenticular information to achieve a visual effect;

FIGS. 3A and 3B are each a top view of yet other embodiments constructed in accordance with the principles herein wherein sequins contain embedded positional information;

FIGS. 18 and 19 illustrate an ordered arrangement in the placement of overlapping sequins using position and orientation information contained therein;

FIG. 20 illustrates an embodiment wherein a plurality of lenticular lenses are provided over a target designated surface, such as a fabric in a visual plane of sequins to form an ornamental sequin system surface of interlaced colors or images;

FIG. 20A illustrates an enlarged view of a section of FIG. 20;

FIG. 21 shows yet another embodiment wherein one or more sequins, shown generally at 2100, can maintain rotational orientation when sewn around one or more notches 2110, 2120, 2130, disposed along an edge or edges of the sequin and/or an aperture 2140;

FIG. 32A illustrates an application of the panel of FIG. 25 incorporated into a promotional device;

FIG. 32B illustrates an application of the panel of FIG. 25 incorporated into a promotional device;

Throughout the various figures, like reference numbers refer to like elements.

DETAILED DESCRIPTION

Figure 4:
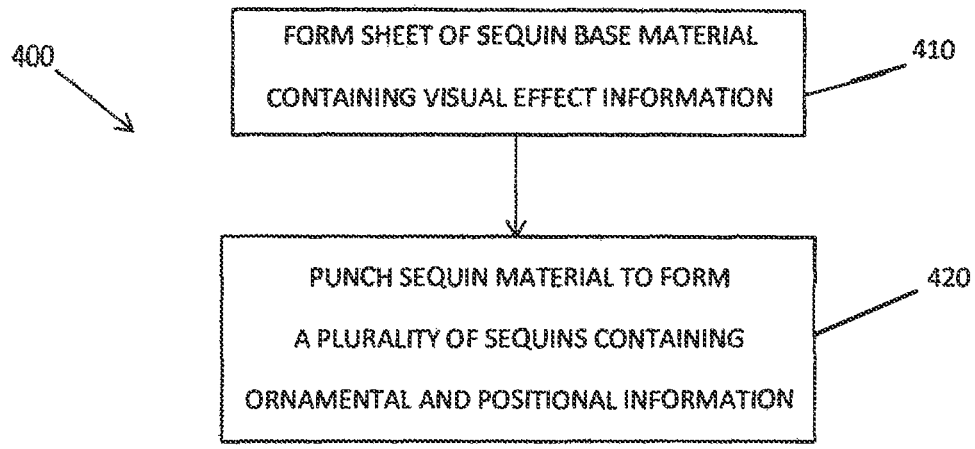
FIG. 4 is a flow chart for an exemplary method constructed in accordance with the principles herein.

FIG. 1 illustrates an exemplary embodiment of a sequin system shown generally at 100 constructed in accordance with the principles of the present disclosure. The system 100 includes at least one sequin 110 or a group of sequins 110, 112, 114, 116, and 118, and a preselected lenticular lens, such as a single preselected lens 120 having a Radius R and disposed at a selected distance t from a surface 130 of the sequin 110. The preselected lenticular lens 120 can be supported over a sequin at a preselected distance t or disposed on the sequin.

Alternatively, an array of preselected lenticular lenses, such as, for example, a linear array of lenses 121 and 122 formed over a sequin 112; a curved array of lenticular lenses 123, 124, and 125 over a sequin 114, a radial array of lenses 126, 127, 128, and 129 over a sequin 116, or any other suitable geometric arrangement to accommodate a desired visual effect can be formed directly over or on the surface 130 of a suitable sequin, such as sequin 110. Interlaced images can be provided on a back of the lenticular lens or on the surface 130 of the sequin 110. A lenticular lens of a preselected size and shape can be applied using a suitable method, such as, for example, printing, etching, heat transfer, or any other suitable method to cover all or a portion of the sequin in a desired geometry.

Lenticular lens 120 can be provided over a target designated surface, such as a fabric 140 in a visual plane of the sequin 110 to form an ornamental sequin system surface of interlaced colors or images. Further, the fabric 140 can be any suitable fabric, such as, for example, a stretchable fabric. Visual effects can be achieved in accordance with the principles herein to include interlaced graphical content providing a color array, an image, an animation or any other suitable visual effect with the sequin system 100. Further, when use in conjunction with a substantially transparent base material, interlaced content can include clear areas that can expose the underlying target designated surface, providing background color neutrality. It is anticipated that the use of reflective ink for printing non-clear sections will enhance the visibility of graphic content displayed on or through transparent or other base material. Other enhanced visual effects can be achieved by incorporating, for example, optical grating, thin film effect, or any other suitable enhancement.

The interlaced images are independently viewable, depending on the angle of observation. At a first viewing angle, a first set of interlaced image slices or segments appears through the lenticular lens element(s). As the angle of view through the lenticular lens changes, another set of interlaced image slices or segments becomes apparent and the first set shifts out of focal view. In another exemplary embodiment, image portions on sequins can be shown together in an ornamental sequin system constructed in accordance with the principles herein so as to form a larger image when viewed together so as to form one or more mosaic, which can be expanded to provide one or more pattern or montage and can incorporate, if desired, other decorative elements, such as, for example, one or more beads. To this end, corresponding portions of the graphic content of a given sequin may be repeated on adjacent sequins to ensure formation of a complete image in cases where overlapping sequins are desired. Additionally, lenticular images can be embedded in other decorative elements such as, for example, one or more beads.

Moreover, the material, geometry, thickness, and the color of a lens can be varied, as desired, to achieve a desired optical effect. For example, in an embodiment lenticular lenses of various sizes can be combined to achieve a unique visual effect. The variation in sizes can be random or can be determined by any number of suitable methods including, for example, an arithmetic scale or mathematical function.

As illustrated in FIGS. 2A to 2C, animation, color array, or image information, respectively, or any suitable combination of visual information can be incorporated into an exemplary sequin 210A to 210C constructed in accordance with the principles herein. With a lenticular or barrier surface, unique 3D and animations can be created in accordance with the principles herein.

In an exemplary embodiment, an information device can be incorporated onto a sequin, as illustrated in FIGS. 3A and 3B. The information device can include any suitable device such as, for example, a magnetic recording, machine-readable marking, or radio frequency identification tag, as illustrated at 310 in FIG. 3A. In an embodiment, a multiplicity of such data points can be embedded on a given element or sequin and used to represent a serial numbering scheme for a mapping process. Each data point can be pre-assigned to represent a binary magnitude, in that for any given place setting (binary magnitude), the corresponding frequency or frequencies would be found to be present or not, rendering either a one or a zero.

Mapping is particularly useful when, for example, a sequin is lost or an application process is interrupted and information is needed to determine when the process stopped or which sequin was lost.

The possible number of combinations actually doubles with each additional binary magnitude anticipated. Absence of data point information can signify a default next relative position or end of sequence.

Alternatively, the information device can include, for example, a binary code as illustrated at 320 in FIG. 3B, or any other suitable information, magnetic information, bit array, binary bit flag enumerator, bar code made of invisible ink, or any other device, used in conjunction with an apparatus adapted for decoding or encoding in order to use the information to control the application apparatus to produce an ordered arrangement in the placement of the sequins, such as the position and orientation information contained therein. In an embodiment, the information device can be printed onto a sheet of sequin base material during a printing process. In accordance with the principles herein, each sequin can be modified further to include a physical modification, such as a notch, for further assisting in orienting the sequin and creating a unique visual effect.

Exemplary methods for printing processes that are capable of producing suitable color arrays, animations, images or combinations thereof can include, for example, conventional printing methods such as screen, letterpress, flexographic, offset lithography, or other suitable methods, as well as non-impact printing methods such as electrophotography, iconography, magnetography, ink jet, thermography, and photographic printing.

An exemplary method, shown generally at 400 in FIG. 4, and constructed in accordance with the principles herein can include the following steps. First, a sheet of sequin base material containing visual effect information is formed at 410. Next, the sequin base material is punched from the sheet at 420 to form a plurality of sequins, the plurality of sequins containing both information required to form an ornamental arrangement and positional information, thereby adapting the plurality of sequins for application to a surface. In addition, registration marks or a magnetic strip can be included on the sequin base material beyond the perimeter of the intended sequin, which is readable by the processing equipment to ensure that it operates at the proper location and produces each sequin inclusive of all its associated graphical content in accordance with the principles herein.

Figure 5:
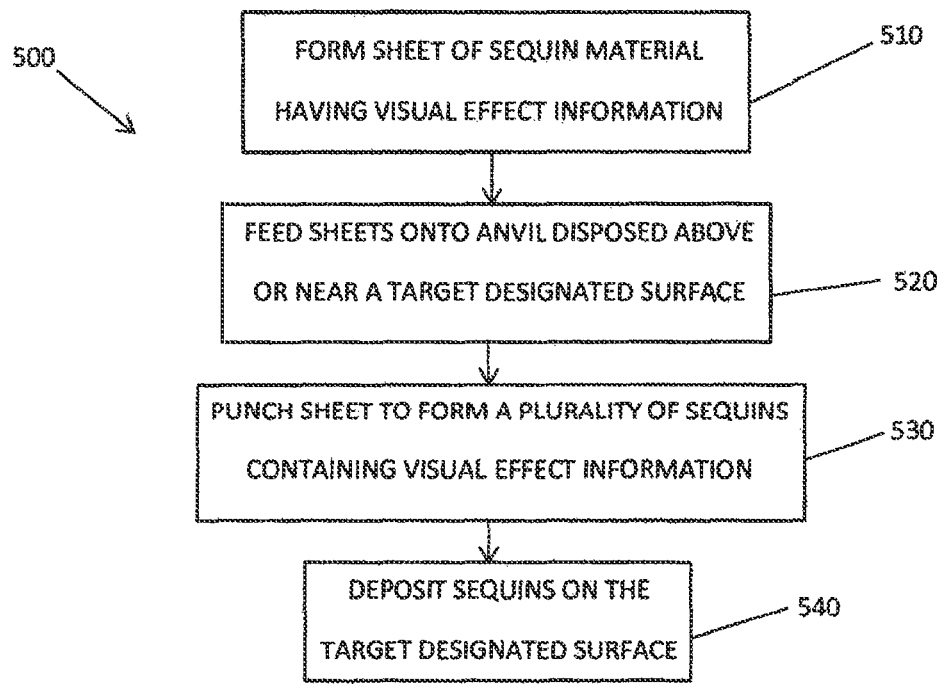
FIG. 5 is a flow chart of another exemplary method constructed in accordance with the principles herein.

As illustrated in FIG. 5, an exemplary method shown generally at 500 can include the following steps. First, a sheet of sequin base material containing visual effect information is formed at 510. Next, the sheet is fed onto an anvil disposed above or near a fabric sheet at 520. Finally, the sheet is punched at 530 to form a plurality of sequins, the plurality of sequins containing both information required to form an ornamental arrangement and positional information, thereby adapting the plurality of sequins for application to a surface at 540.

Figure 6:
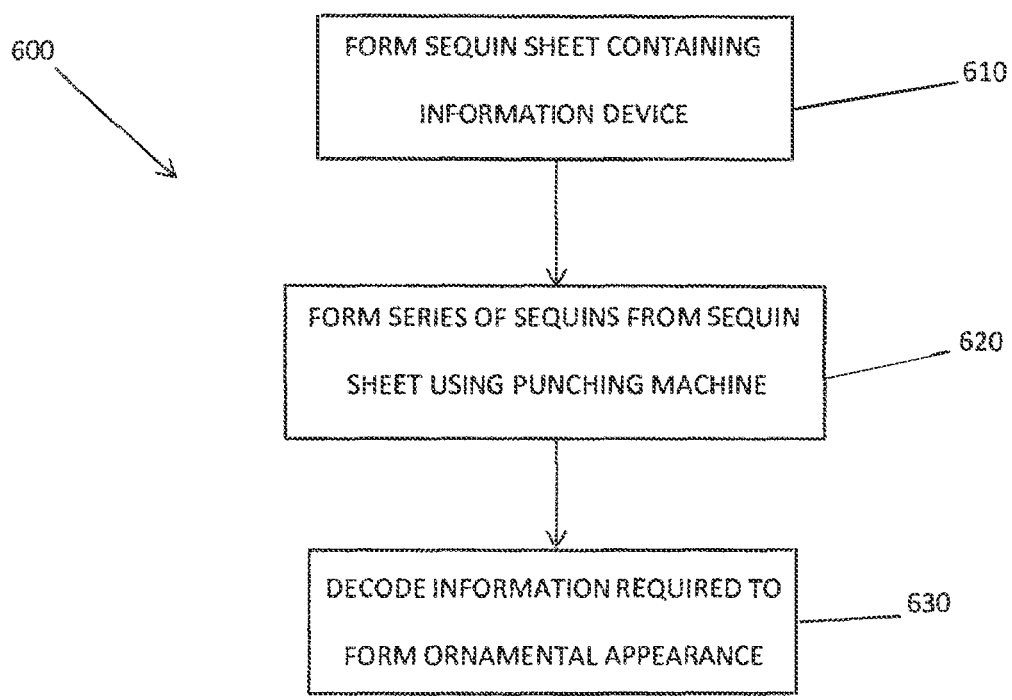
FIG. 6 is a flow chart of still another exemplary method constructed in accordance with the principles herein.

As illustrated in FIG. 6, an exemplary method shown generally at 600 can include the following steps. First, a sequin base material containing an information device is formed at 610. Next, a connected series of sequins having edges is formed at 620 using a conventional punching machine. Finally, information contained thereupon required to form the ornamental arrangement of the ornamental sequin system is decoded at step 630.

In each exemplary process above, understanding the occurrence of, and planning to avoid the problems associated with, disaster recovery when applying, for example, an ornamental sequin system having a complicated arrangement, is useful for achieving the ornamental system in accordance with the principles herein.

Figure 7:
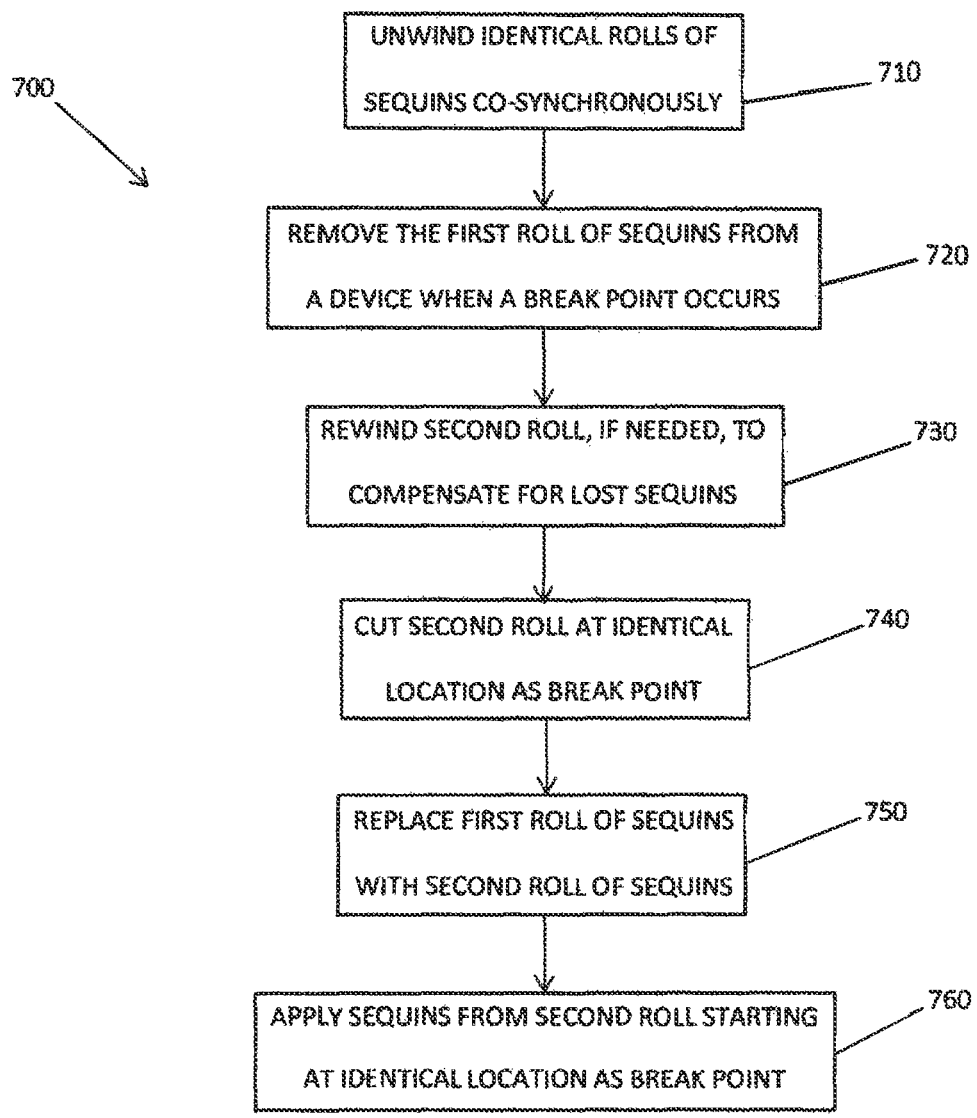
FIG. 7 is a flow chart of an exemplary process constructed in accordance with the principles herein.

Alternatively, information contained in yet another exemplary system illustrated generally at 700 in FIG. 7 can enable a sequential process that avoids the problems associated with disaster recovery in an ornamental sequin system. To this end, identical rolls of sequins can be unwound co-synchronously at 710 using a suitable application apparatus, such as, for example, an apparatus attached to or incorporated in an embroidery machine. Sequins from the first roll of the identical rolls are applied to the target designated surface as the sequins are unwound from the first roll by the application apparatus, while sequins from the second roll are unwound at an identical rate as the sequins from the first roll.

The first roll is removed from the application apparatus when a break occurs at a break point at 720 while applying the sequins from the first roll to the target designated surface. The second reel is rewound at 730 to compensate for the number of sequins lost in the incident and cut at 740 to create an end from which to restart the attachment process. Next, the first roll is replaced by the second roll at 750. Sequins from the second roll are then applied to the target designated surface starting from an identical location on the second roll as the break point of the first roll at 760, as shown in the flow chart of FIG. 7.

In accordance with the principles herein, any suitable procedure can be employed to apply a sequin system constructed in accordance with the principles herein to a target designated surface, such as, for example, sewing, adhesive, punching, heat transfer, or any other suitable procedure.

Figure 8A:
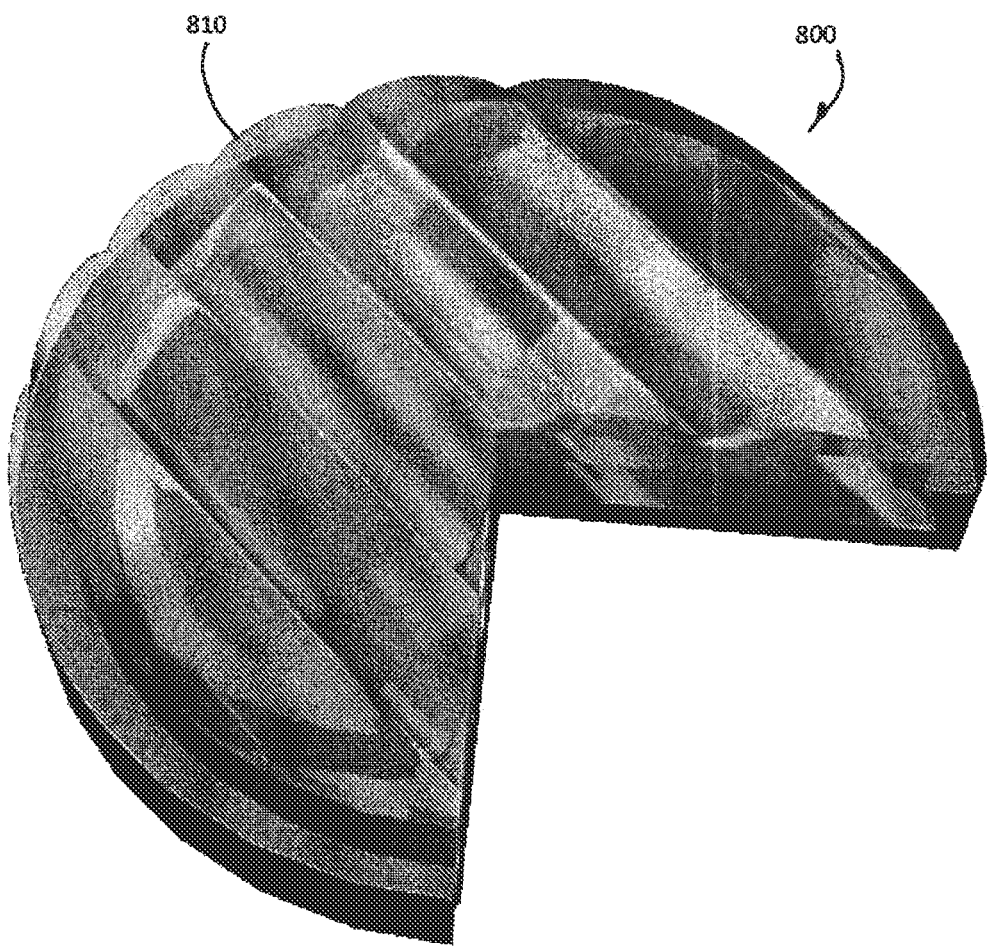
FIG. 8A is a perspective view, partially in section of an ornamental sequin constructed in accordance with the principles herein.

As illustrated in FIG. 8A, a lenticular lens 810 can be applied across the entire surface of an ornamental sequin system shown generally at 800. The lenticular lens 810 can include, if desired, a non-linear surface, such as for example, a concave surface as shown in FIG. 8A. Alternatively, any surface of the lenticular lens 810 can include any chosen topology, such as, for example, a graduated surface, convex surface, or any other selected topology.

Figure 8B:
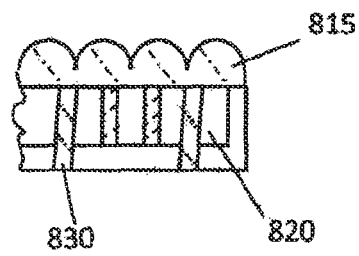
FIGS. 8B and 8C are front sectional views of alternative embodiments of FIG. 8A.
Figure 8C:
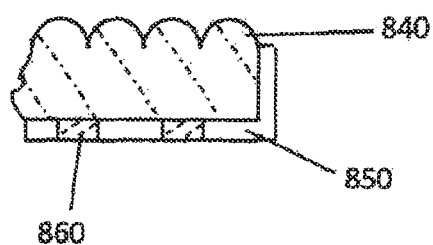
Figure 8D:
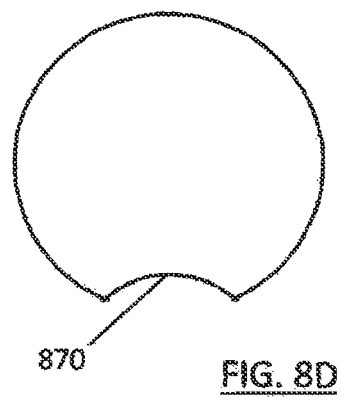
FIG. 8D is a top view of one exemplary sequin constructed in accordance with the principles herein.
Figure 8E:
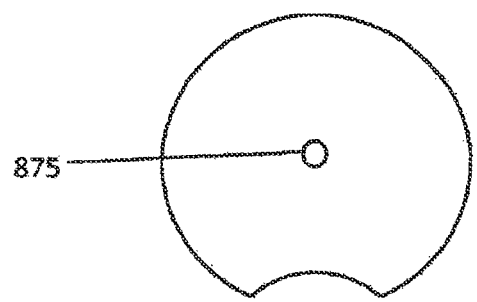
FIG. 8E is a top view of another exemplary sequin constructed in accordance with the principles herein.
Figure 8F:
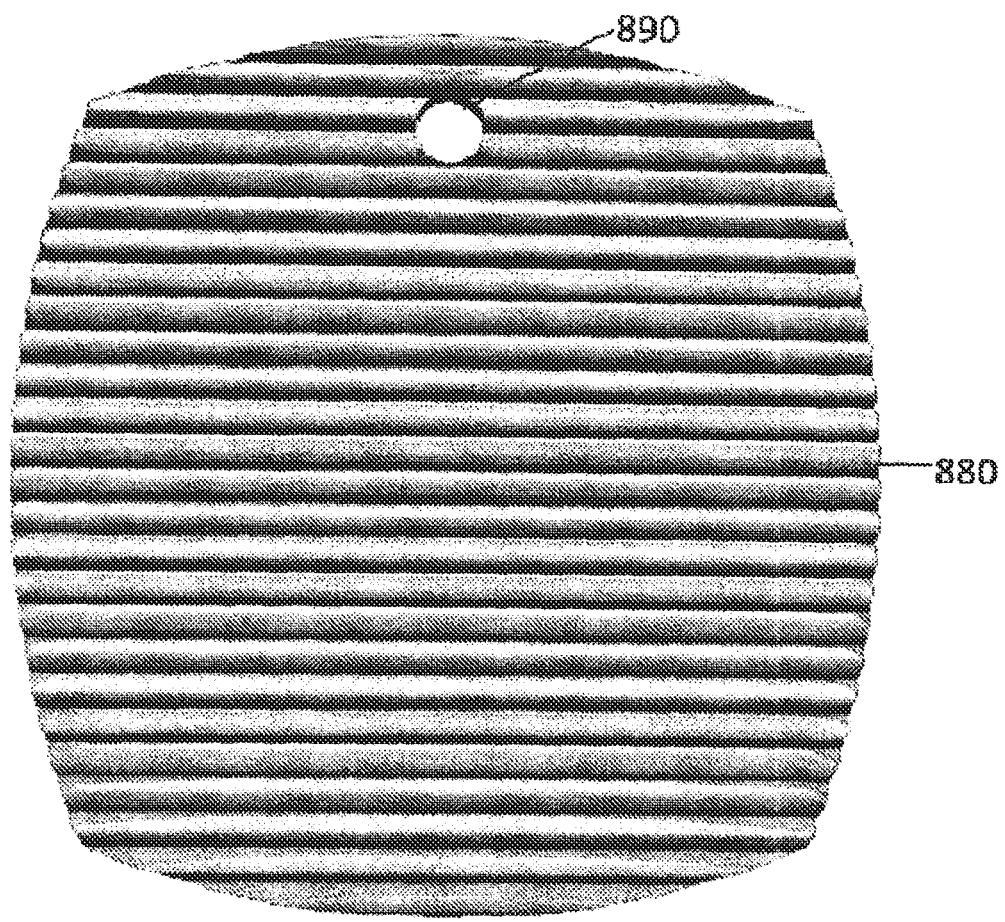
FIG. 8F is a top view of yet another exemplary sequin constructed in accordance with the principles herein.

As illustrated in FIG. 8B, the ornamental sequin system can include a lenticular lens 815 over transparent sections 830 on a sequin surface 820 of the sequin system 800. A lenticular lens 840 can be provided on a surface 850 of a sequin, as illustrated in FIG. 8C, wherein interlaced sections 860 are provided on the sequin surface 850. As shown in FIGS. 8D and 8E, a sequin can be modified to provide orientation information such as, for example, by providing a notch 870 along an edge of the sequin and/or an aperture 875. FIG. 8F illustrates yet another embodiment of an ornamental sequin system constructed in accordance with the principles herein, wherein a lenticular lens 880 forms the entirety of a sequin other than an optional aperture 890. The aperture can be positioned, for example, substantially above the center of gravity of the sequin, so as to allow the sequin to dangle and swing and yet regain the desired general alignment of the sequin when motion ceases.

Figure 9:
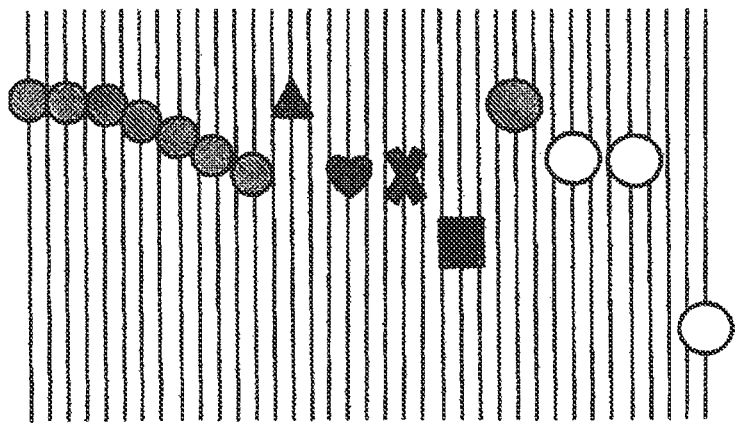
FIG. 9 is a sectional view of threads arranged for weaving into a fabric, showing multiple exemplary arrangements of sequins along the threads adapted for weaving directly into a fabric.
Figure 10:
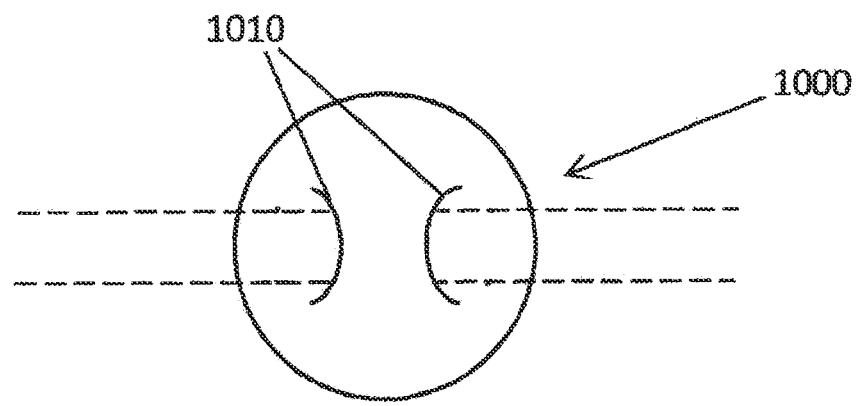
FIG. 10 is a rear view of an exemplary sequin adapted for the system of FIG. 9.

In accordance with the principles herein, sequins can be adapted and constructed to be woven directly into a loom after stamping them out, as illustrated, for example in FIG. 9. Further, if desired, the sequins can incorporate suitable slits 1010 or any other suitable structural adaptation in order to thread the sequins directly so as to retain the desired position and/or alignment within the overall finished work, as illustrated, for example, in the embodiment shown generally at 1000 in FIG. 10.

Figure 11A:
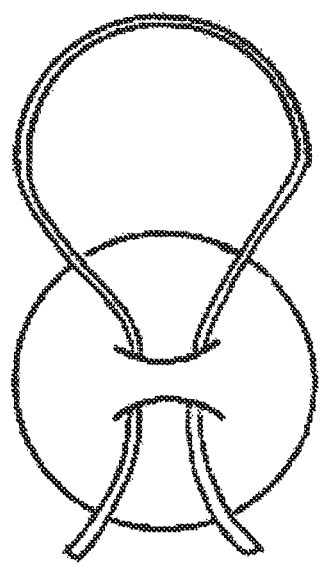
FIGS. 11A and 11B are rear and front views, respectively, of sequins disposed upon a loop of material, such as yarn, in preparation for incorporation into a knit.
Figure 11B:
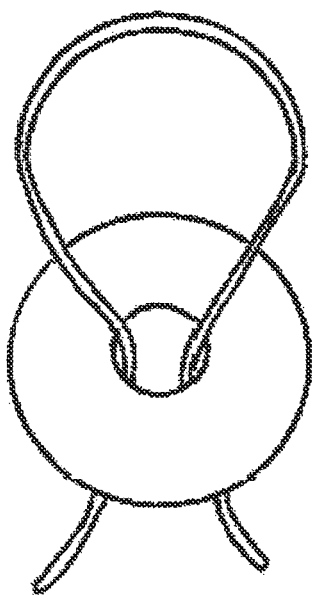

Further, as illustrated in FIGS. 11A and 11B, a sequin can be disposed upon a loop of yarn or thread for the purpose of knitting. The interlocking loops of a knit can stabilize the sequin position within a work.

Clearly, such effects require placement where preferred on a target designated surface, such that positional information can be useful to achieving the unique effects contemplated in accordance with the principles herein. Then advantageous optical properties using same colors, color complements, or various different colors can be used singly or in combination to create a visual effect.

Figure 12:
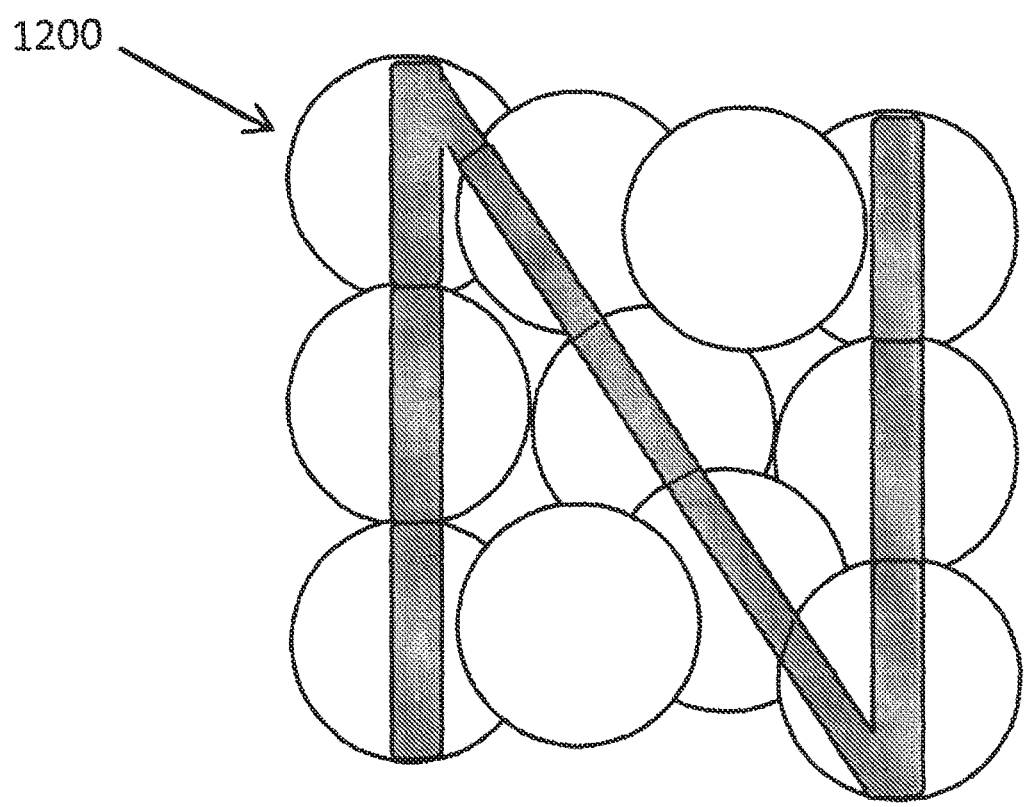
FIG. 12 illustrates an embodiment, wherein image portions on sequins can be shown together.

FIG. 12 illustrates an embodiment, shown generally at 1200, wherein image portions on sequins can be shown together. Specifically, image portions on sequins can be shown together in an ornamental sequin system constructed in accordance with the principles herein so as to form a larger image when viewed together so as to form one or more mosaic, which can be expanded to provide one or more pattern.

Figure 13:
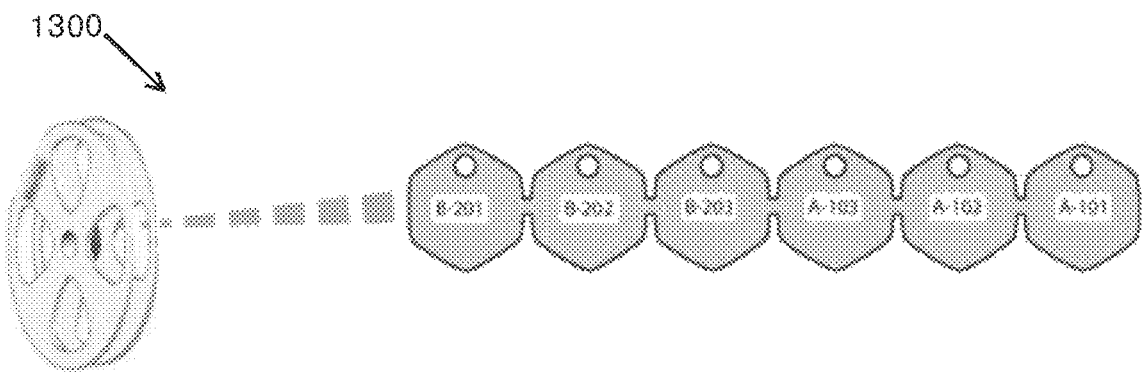
FIGS. 13 and 14 illustrate an ordered arrangement in the placement of sequins using position and orientation information contained therein, as represented by the ordered sequins numbered A101, A102, A103 and B201, B202, and B203, which are also illustrated in FIGS. 16 through 19 below.
Figure 14:
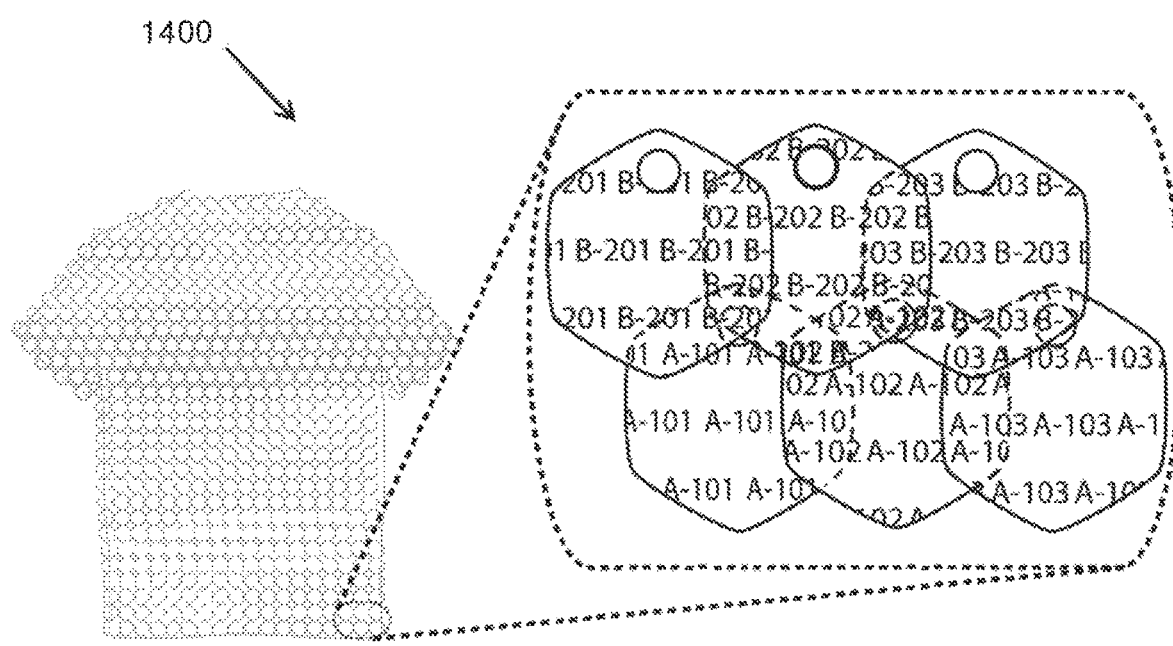

FIGS. 13 and 14 illustrate an ordered arrangement in the placement of sequins, shown generally at 1300 and 1400, using position and orientation information contained therein.

Figure 15:
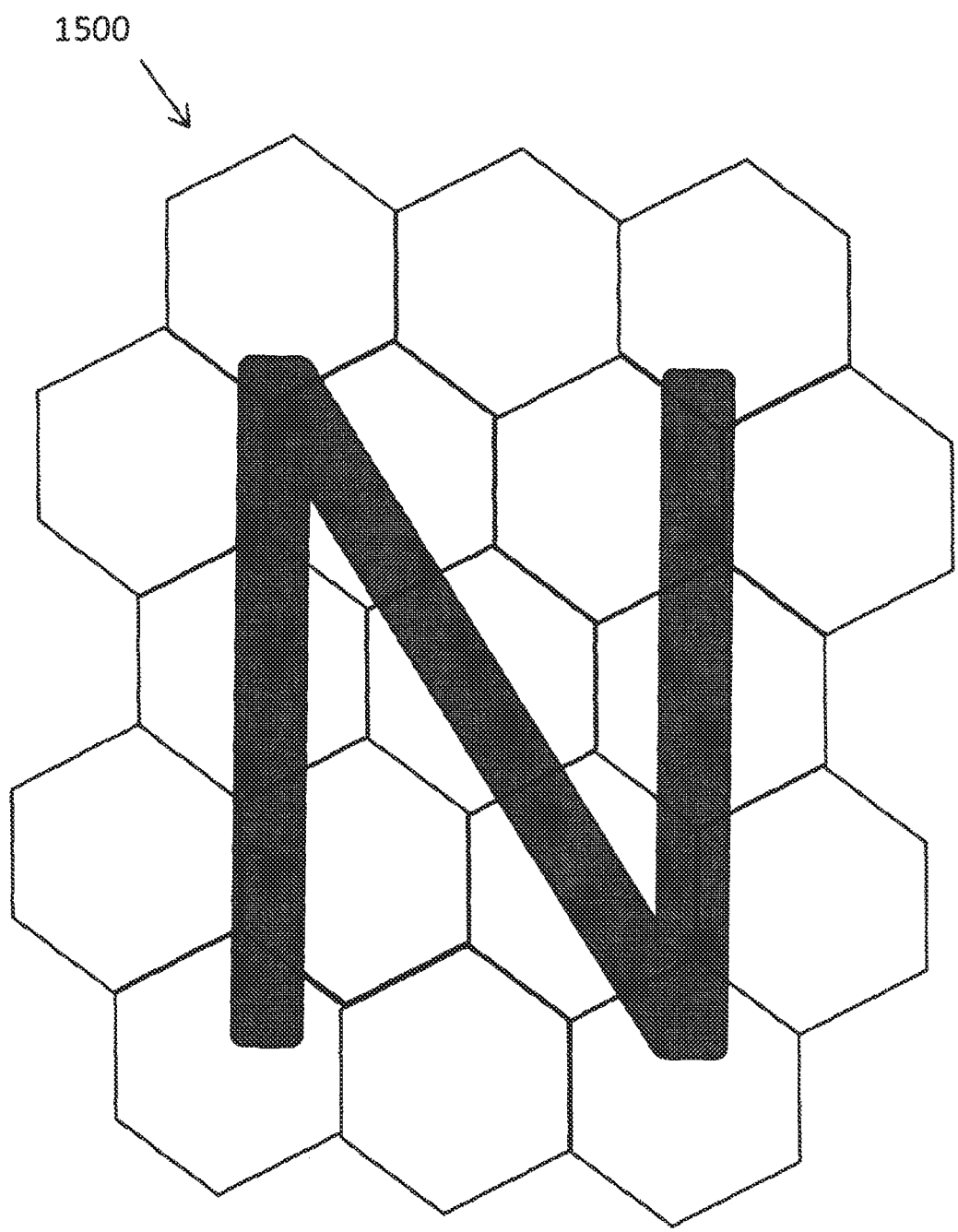
FIG. 15 illustrates an exemplary embodiment containing adjacent sequins of an exemplary geometric shape.

FIG. 15 illustrates an exemplary embodiment, shown generally at 1500 containing adjacent sequins of an exemplary geometric shape.

Figure 16:
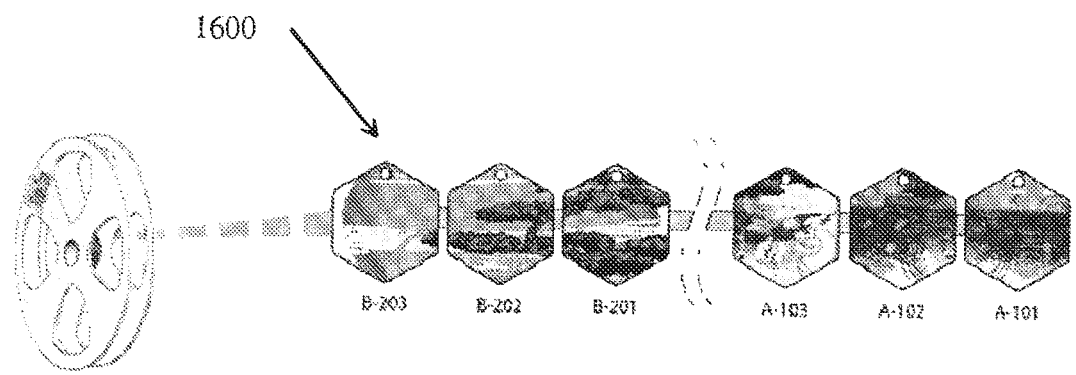
FIGS. 16 and 17 illustrate an ordered arrangement in the placement of adjacent sequins using position and orientation information contained therein.
Figure 17:
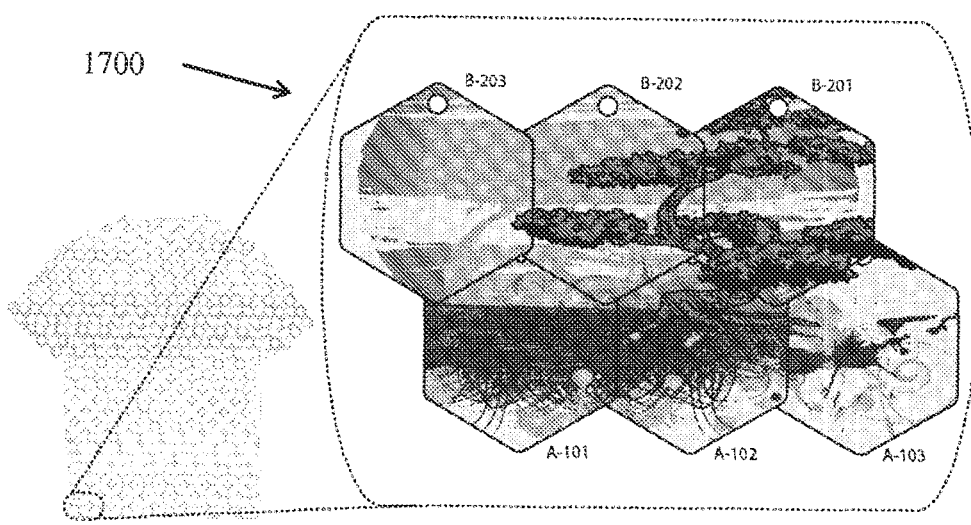

FIGS. 16 and 17 illustrate an ordered arrangement in the placement of adjacent sequins, shown generally at 1600 and 1700, using position and orientation information contained therein.

FIGS. 18 and 19 illustrate an ordered arrangement in the placement of overlapping sequins, shown generally at 1800 and 1900, using position and orientation information contained therein.

FIG. 20 illustrates an embodiment, shown generally at 2000, wherein a plurality of lenticular lenses are provided over a target designated surface, such as a fabric in a visual plane of sequins to form an ornamental sequin system surface of interlaced colors or images.

FIG. 20A illustrates an enlarged view of a section of the ornamental sequin system surface of interlaced colors or images shown generally at 2000 of FIG. 20. 2010 shows one of the interlaced colors or images and 2020 shows another one of the interlaced colors or images.

FIG. 21 shows yet another embodiment wherein one or more sequins, shown generally at 2100, can maintain rotational orientation when sewn around one or more notches 2110, 2120, 2130, disposed along an edge or edges of the sequin and/or an aperture 2140.

Figure 22A:
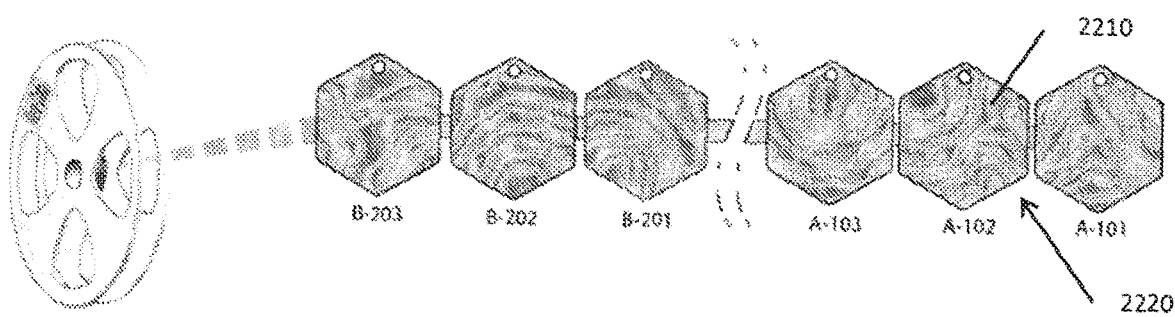
FIG. 22A is a front view of yet another embodiment constructed in accordance with the principles herein.
Figure 22B:
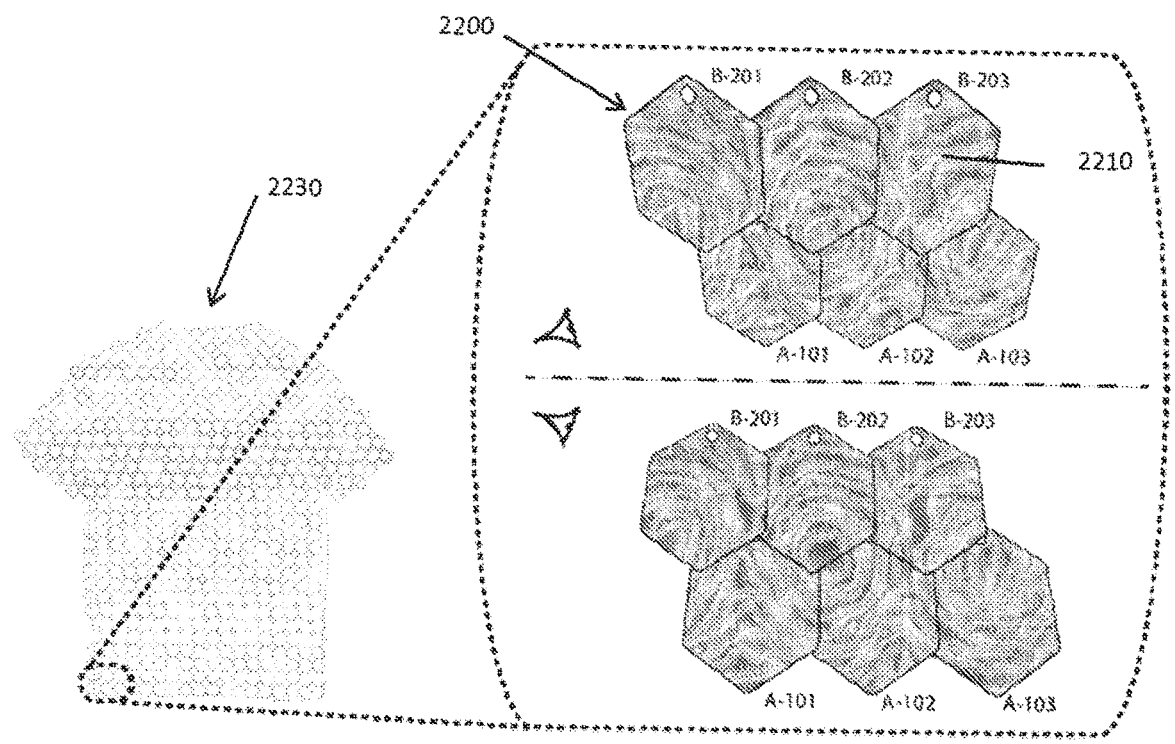
FIG. 22B is a front view of an application of the embodiment of FIG. 22A, including a close-up section showing an area as seen from slightly above and slightly below eye level.

FIGS. 22A and 22B illustrates an exemplary embodiment of a non-holographic lensed display comprising a rubbery optical film material having multiple parabolic lenses therein.

FIGS. 22A and 22B illustrate an ordered arrangement 2220 in the placement of adjacent sequins 2210 of an array of sequins, such as B203, B202, B201, A103, A102, A101, of FIG. 22A that can be ordered as shown in FIG. 22B with a lower row A101, A102, A103 and an upper row B201, B202, B203 as applied to an article of manufacture using relevant position and orientation information which may be contained therein. In this embodiment, the sequins can be of a RowLux® style which provides a visual effect that appears to move across the surface in a predefined pattern in keeping with any change of the observer's viewpoint. Reproducing this effect among an arrangements of sequins requires that the position and orientation of each sequin 2210 in the arrangement 2220 is appropriate to allow the visual effect pattern to span across adjacent sequins. Efficiency in arranging and applying the sequins can be greatly increased by pre-sorting them to dispense in the same order they are intended to be applied upon a exemplary suitable decorative surface 2230.

FIG. 22A illustrates this intent with sequin 2210 elements A-101 through A-103 designated to be applied as part of the bottom row in the detailed section of FIG. 22B. It should also be noted that the detailed section of FIG. 22B shows the identical arrangement of sequins from both slightly above and below eye level and is intended to illustrate the apparent shift and visual effect. A similar shift would occur commensurate with any change in the observer's relative viewpoint regardless of the direction of change. Furthermore, FIG. 22A also indicates, by way of a pair of curved dashed lines crossing the successive sequins depicted as dispensing from a reel, that the remainder of the sequins designated for that same row, not depicted in the detailed section, are implied but not shown. Should it be desirable that the sequins slightly overlap one another (imbricated), the overlapping sequins could contain the matching visual effect pattern in the overlapped areas, so that the appearance of the visual effect formed by the sequins is retained when the sequins move in and out of the overlapping position when, for example, the decorative surface is in motion.

Figure 23:
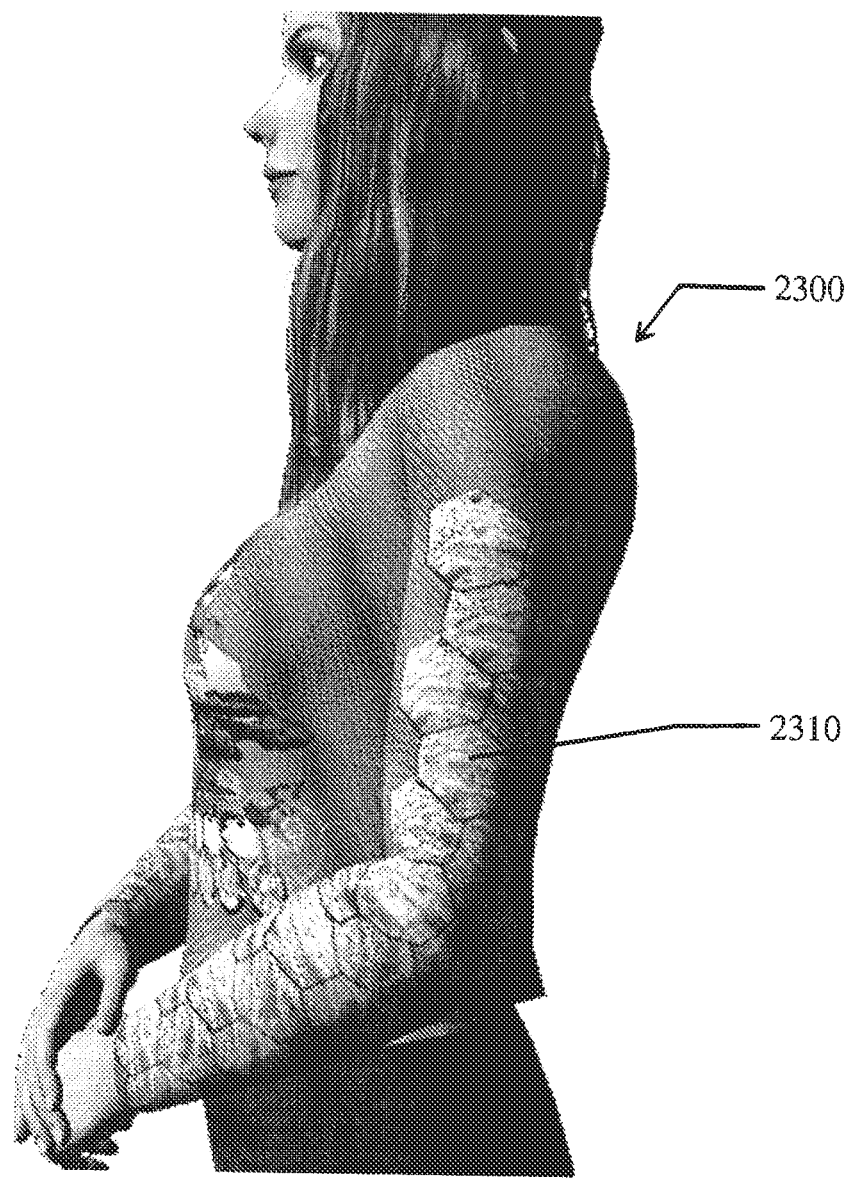
FIG. 23 illustrates an application incorporating an embodiment constructed in accordance with the principles herein.

FIG. 23 illustrates an application, shown generally at 2300, of an optical display wherein the display comprises at least one sequin, 2310 formed of a rubbery optical film material to provide optical advantages using lenses in tactile friendly materials, as discussed for example in U.S. patent application No. 62/041,073, incorporated by reference herein in its entirety. For example, fashion involves the production of articles that can satisfy consumer demands and preferences. One preference many consumers have is to purchase products that feel good to the touch. Although some products have attempted to incorporate or produce unique optical properties using know lenses and materials, the known optical devices fail to produce rubbery soft materials that feel good to the touch.

FIG. 23 illustrates an application, shown generally at 2300, of an optical display wherein the display comprises at least one sequin, 2310 formed of a rubbery optical film material to provide optical advantages using lenses in tactile friendly materials, as discussed for example in U.S. patent application No. 62/041,073, incorporated by reference herein in its entirety. For example, fashion involves the production of articles that can satisfy consumer demands and preferences. One preference many consumers have is to purchase products that feel good to the touch. Although some products have attempted to incorporate or produce unique optical properties using know lenses and materials, the known optical devices fail to produce rubbery soft materials that feel good to the touch. As set forth in U.S. Ser. No. 62/041,073, a need exists for pliable or rubbery optical devices that are especially suited for a variety of applications that require an improvement over the stiff optical devices currently known in the art. This is particularly true of applications involving compound curves, or that undergo complex motion.

For example, fashion involves the production of articles that can satisfy consumer demands and preferences. One preference many consumers have is to purchase products that feel good to the touch. Although some products have attempted to incorporate unique optical properties by encasing lenses, such as discussed in U.S. Pat. No. 7,364,314, the resulting products are not suitable to meet that consumer preference. In accordance with the principles herein, a pliable optical device that overcomes the deficiencies of the known devices is set forth.

Figure 24:
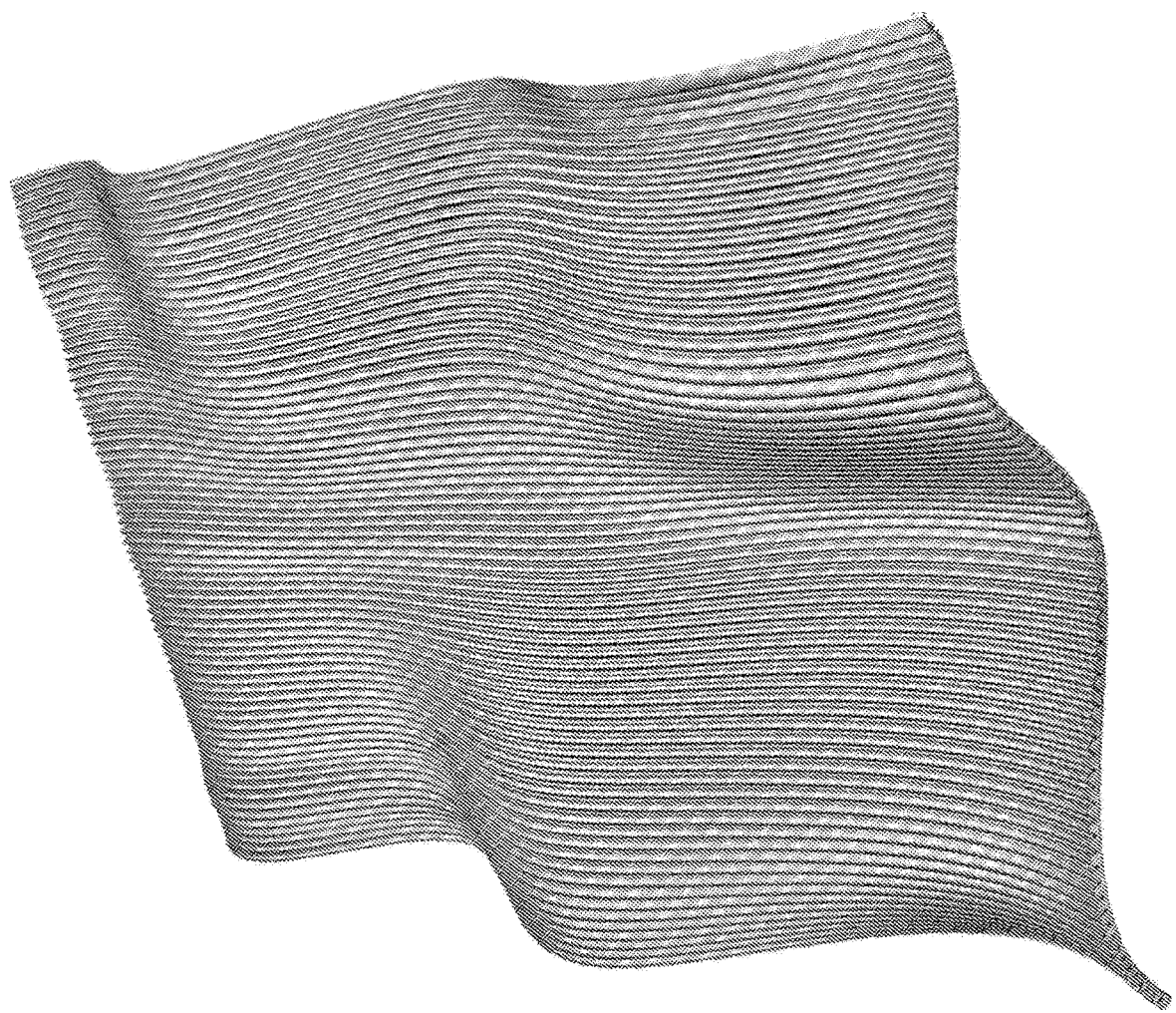
FIG. 24 illustrates a cylindrical lenticular lens array panel constructed in accordance with the principles herein.

FIG. 24 illustrates an exemplary embodiment of a cylindrical lenticular lens array formed using a suitable rubbery optical material constructed in accordance with the principles herein. Alternative embodiments can include any other suitable microstructure or lens type in accordance with the principles herein. The lenticular lens array is not only flexible, but also can move or conform to wavy contours in multiple directions as illustrated in FIG. 24.

Figure 25:
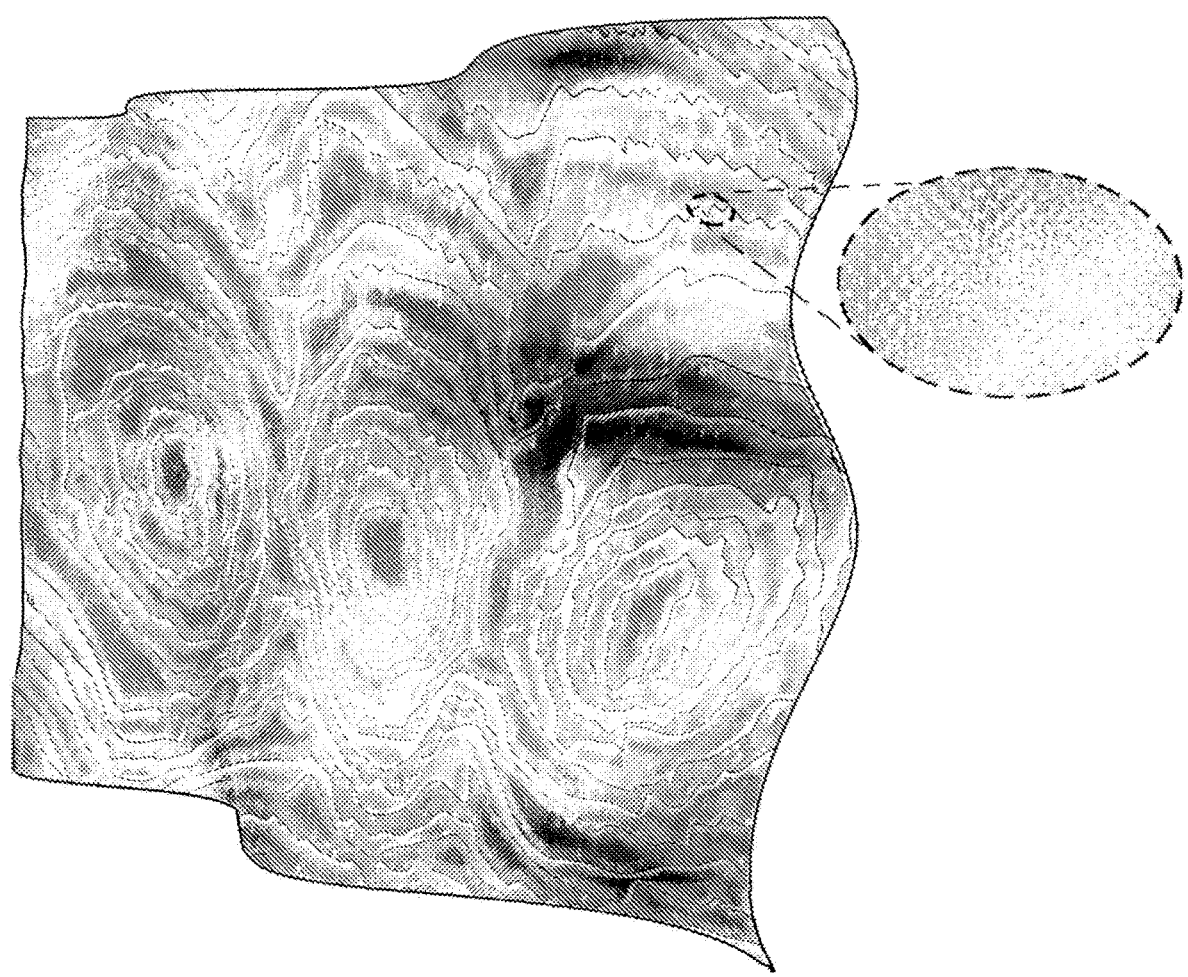
FIG. 25 illustrates a RowLux® style panel constructed in accordance with the principles herein.

As illustrated in FIG. 25, another exemplary embodiment constructed in accordance with the principles herein includes a Rowlux® style embodiment, where Rowlux® is manufactured by Rowland Technologies Inc of Wallingford, CT, USA, which describes Rowlux® as, "a multi-lensed effect thermoplastic film manufactured in polycarbonate, flexible PVC and PETG. Rowlux gets its effects of motion and dimension from thousands of minute parabolic lenses that are molded into the surface on both sides of the film. These lenses create a pattern of absorption and reflection of light which result in optical characteristics that are remarkable and unique. Shimmering silk, stardust sparkles, geometric repetition and three dimensional are some of the ways to describe this material." The Rowlux® style embodiment of FIG. 25 exhibits a visual effect that appears as a luster and/or a sense of depth that rolls across the material in accordance with the relative viewpoint of the observer and where the material is formed using a suitable rubbery optical material. The drawing of FIG. 25 depicts such a visual effect and includes a detail section intended to portray its microlenses that are not otherwise generally visible to the naked eye due to their very small size.

Figure 26:
FIG. 26 illustrates an exemplary lens array formed using a suitable rubbery optic material fashioned into a panel.
Figure 27:
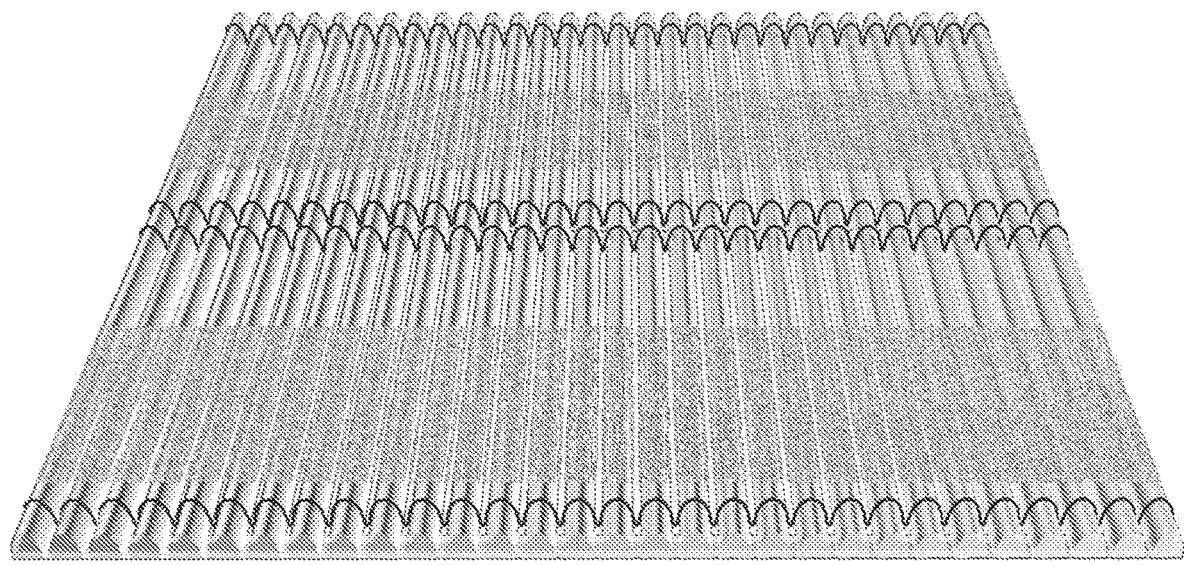
FIG. 27 illustrates an exemplary lens array formed using a suitable rubbery optic material fashioned into a panel.
Figure 28:
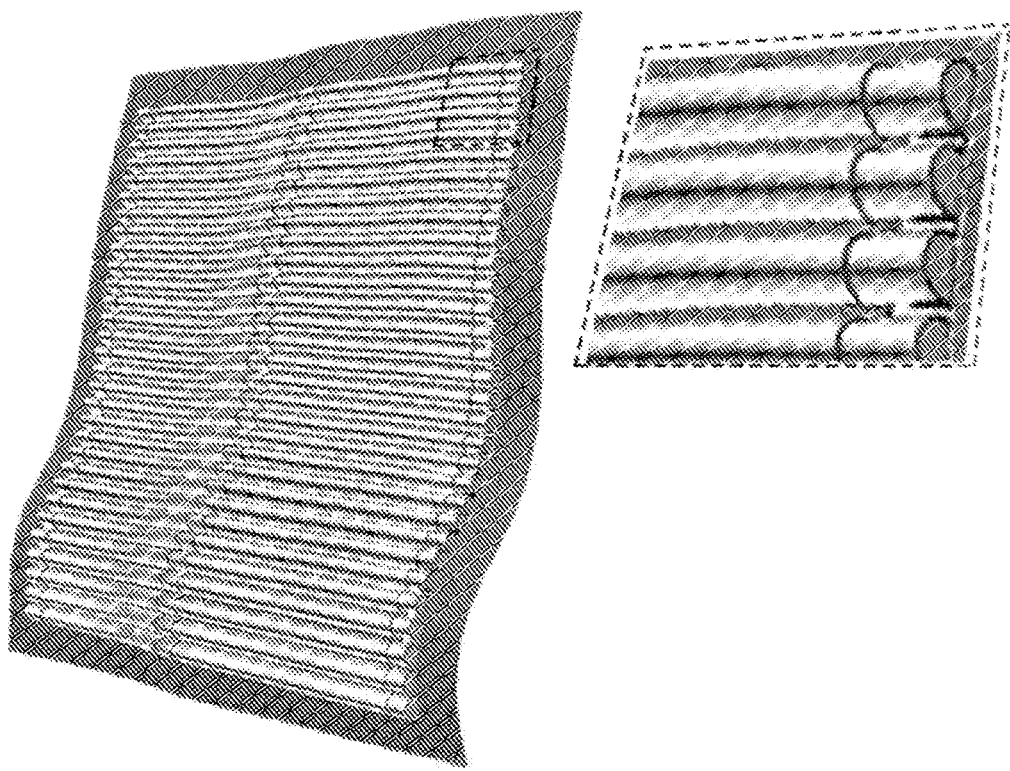
FIG. 28 illustrates an exemplary lens array formed using a suitable rubbery optic material fashioned into a panel.

As illustrated in FIGS. 26, 27 and 28 an exemplary lens array formed using a suitable rubbery optic material can be fashioned into a panel, for example. The panel can be applied to, for example, a suitable fabric as shown in FIG. 28. Some narrow areas can be left open to allow airflow. Some small areas can bridge the airflow openings to connect one lense to the other to make sure the lenses all remain forward facing as shown in the enlarged view of FIG. 28.

The panel can feature open areas for airflow (ventilation). It should be noted that the connecting material may be thin enough to allow sewing to be accomplished directly through the material, however depicted in blue, as an exemplary alternative arrangement, are stitches transversing the lenticles and through the open areas. The overall panel can be formed into a suitable shape and/or configuration.

Figure 29:
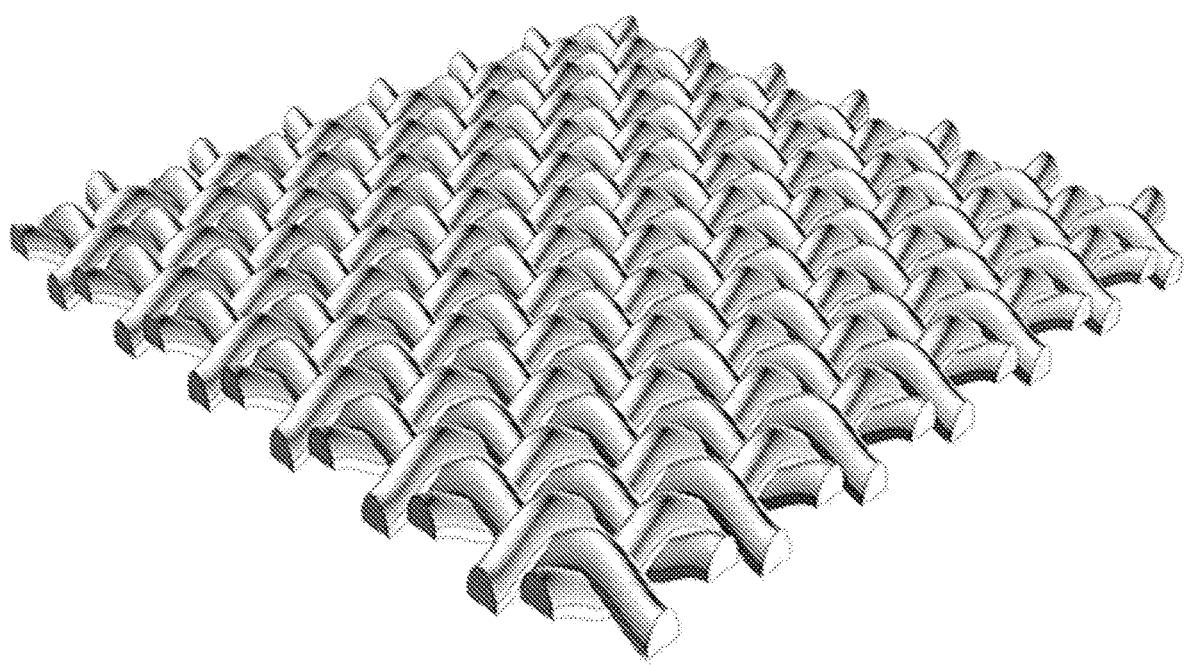
FIG. 29 illustrates semi-cylindrical lenses formed of a suitably pliable optical material woven together.

As shown in FIG. 29, a further exemplary embodiment which envisions semi-cylindrical lenses formed of a suitably pliable optical material are woven together.

Figure 30:
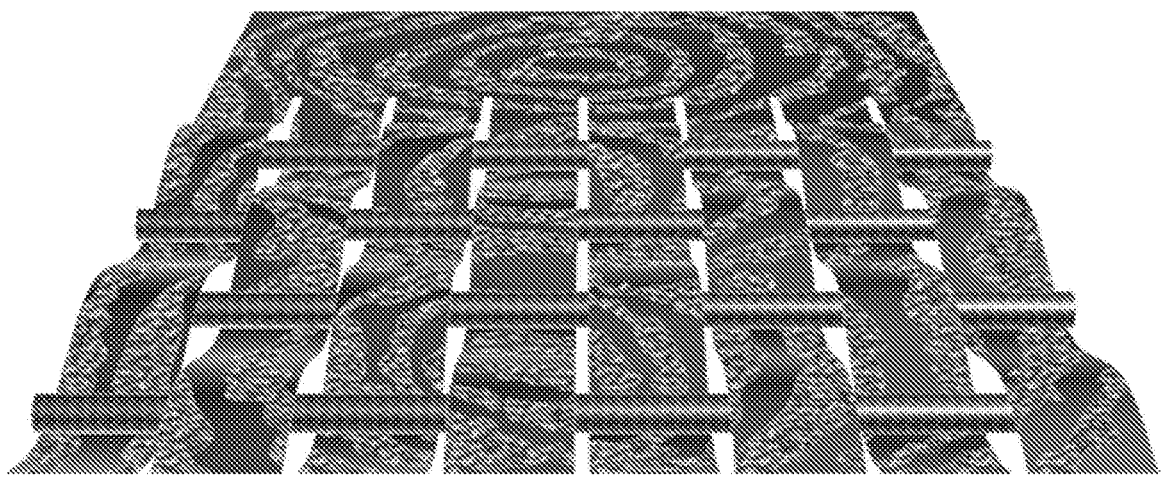
FIG. 30 illustrates an application of the panel of FIG. 25 incorporating a RowLux® style pliable optical film cut into strips and woven together.
Figure 31:
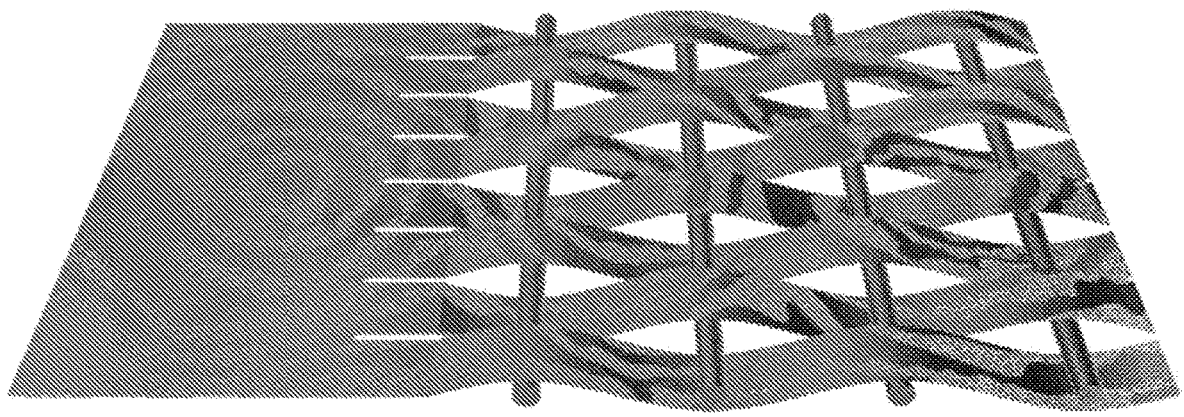
FIG. 31 illustrates an application of the panel of FIG. 25 incorporating a RowLux® style pliable optical film cut into strips and woven together with yarn or thread.

FIGS. 30 and 31 illustrate an application of the embodiment of FIG. 25 incorporating a Rowlux® style pliable optical film that is cut into strips and woven together with yarn or thread.

In yet other exemplary embodiments shown in FIGS. 32A and 32B the embodiment of FIG. 25 can be incorporated into applications that undergo complex motion. 32A and 32B represent the promotional device known as an "air dancer" which is essentially an air sock (typically a fabric tube), most often having a humanlike aesthetic design, through which air is propelled. These are essentially air socks that can be affixed above a column of vertically forced air. This causes the "air dancer" to partially inflate, writhe, and wiggle in such a manner so as to simulate wild dancing action, all for the purpose of attracting attention. Utilizing a material of the embodiment depicted in FIG. 25 suitable for an "air dancer", could allow such visual effects to be activated by the movement of any promotional device so enhanced. FIG. 32A represents one point in time and FIG.

32B represents another point in time of the same device to show the apparent motion of the visual effect. The luster is gliding across the surface while the air sock moves from the configuration of 32A to the configuration of 32B, as might be noted by the shift of the blue lines in the left arm of the air sock, and also throughout the body portion.

The embodiment of FIG. 25 could be strengthened with any suitable reinforcing material, for example fabric, if some particular application might so require.

Figures 33A, 33B:
FIG. 33A illustrates an application of the panel of FIG. 24 incorporated into a shoe.
FIG. 33B illustrates an application of the panel of FIG. 24 incorporated into a shoe.

FIGS. 33A and 33B depict an exemplary application of the embodiment of FIG. 24. Depicted as a shoe enhanced with the embodiment of FIG. 24 installed upon the upper vamp and toebox of the shoe wherein the underside of the lens are printed with, or are laminated to, interlaced colors as is typical for lenticular printing. In FIG. 33A the lens covered portion of the shoe is inclined, sloping downwardly toward the toe, along the length of the shoe. This allows an observer to see one color predominantly with some minor exception. However, in FIG. 33B, the shoe is bent and thus the lens installed thereupon is also flexed so the lensed portion becomes upwardly curved along its length and consequently is exhibited over a wider range of viewing angles which causes more colors to become visible among the lenticles of the lens array. Other graphical effects are equally possible and depend merely on the printing associated with the lens. It should be noted that since this portion of the shoe is convex with respect to its width and concave with respect to its length, due to the flexure as shown in FIG. 33B the lens has assumed a shape conforming to a compound-complex curved surface.

Figure 34:
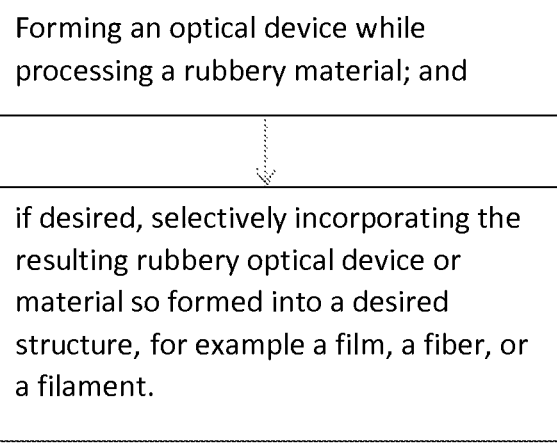
FIG. 34 is a flow chart of a method for production of an optical device.

Although any suitable method can be employed in accordance with a method of the present disclosure, it is contemplated that particular advantage can be achieved through the use of manufacturing methods such as, for example a method illustrated in FIG. 34. As shown in FIG. 34, an exemplary optical device is formed while processing a suitable material, such as, for example, an acrylic block copolymer. One such suitable acrylic block copolymer is Kurarity®, where Kurarity® is manufactured by Kuraray Co., Ltd. Of Tokyo, Japan, which describes Kurarity® as an, "acrylic thermoplastic elastomer [that] exhibits a variety of properties including excellent clarity excellent flexibility excellent mold-ability (injection and extrusion molding)." Once made, the rubbery optical devices constructed in accordance with the principles herein can be incorporated into other devices or material including, for example, film, fiber, or filament.

Figure 35:
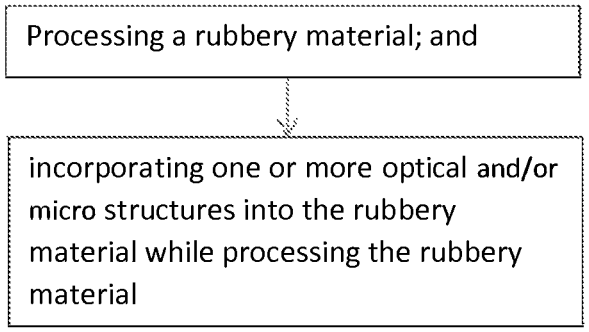
FIG. 35 is a flow chart of a method for incorporating one or more optical structures into a rubbery material.

As illustrated in FIG. 35, another exemplary method includes incorporating one or more optical structures into a suitable rubbery material while processing the rubbery material. One such suitable rubbery material is the aforementioned Kurarity®, which is a moldable acrylic block copolymer.

While exemplary embodiments of the present disclosure are provided herein, various changes and modifications can be made without departing from the spirit and scope of the invention. The scope of the invention is indicated in the appended claims, and all changes that come within the meaning and range of equivalents are intended to be embraced therein. For example, variations in the forming and/or any other features described in the present disclosure are within the spirit and meaning of the appended claims.

I claim:

1. An article of clothing or a clothing accessory comprising an array of sequins for ornamenting the article of clothing or the clothing accessory, the array of sequins comprising:

a viewable side and an attachment side, wherein the viewable side is directed away from the article of clothing or the clothing accessory and the attachment side is directed towards the article of clothing or the clothing accessory;

a plurality of lenticular lenses disposed on the viewable side; and an interlaced graphic comprising two or more sets of graphic interlacings, wherein:

the plurality of lenticular lenses is disposed on or over the interlaced graphic and is configured to output an image of at least portions of the interlaced graphic;

the outputted image is one of the two or more sets of graphic interlacings wherein the set of graphic interlacings outputted varies based on a viewing angle of the viewable side, wherein a first set of graphic interlacings is output along a first viewing angle and a second set of graphic interlacings is output along a second viewing angle; and the interlaced graphic spans a plurality of sequins of the array of sequins, wherein each sequin of the plurality of sequins comprises:

a predetermined position within the array of sequins;

a top face forming part of the viewable side of the array of sequins and a bottom face oppositely directed from the top face and forming part of the attachment side of the array of sequins;

at least one lenticular lens of the plurality of lenticular lenses disposed on the top face;

a portion of the interlaced graphic which is based on said predetermined position within the array of sequins; and an attachment feature configured to attach the sequin to the article of clothing or the clothing accessory and to maintain:

said predetermined position within the array of sequins;

said top face facing away from the attached article of clothing or the clothing accessory and forming part of the viewable side of the array of sequins; and said bottom face facing towards the article of clothing or the clothing accessory and forming part of the attachment side of the array of sequins.

2. The article of clothing or the clothing accessory of claim 1, wherein one or more of the plurality of sequins further comprises position information disposed thereon, wherein said positioning information indicates said predetermined position of said one or more sequins of the plurality of sequins within the array of sequins.

3. The article of clothing or the clothing accessory of claim 1, wherein the array of sequins further comprise at least one partially transparent sequin in the array of sequins.

4. The article of clothing or the clothing accessory of claim 1, wherein said attachment feature is an aperture, wherein said aperture:

passes from said top face to said bottom face; and is configured to receive a thread therethrough at least securing in part said sequin to said predetermined position within the array of sequins and said bottom side to face the article of clothing or the clothing accessory.

5. The article of clothing or the clothing accessory of claim 1, wherein at least one lenticular lens of the plurality of lenticular lenses is made of a transparent elastomer.

6. The article of clothing or the clothing accessory of claim 1, wherein the interlaced graphic comprises one or more colors.

7. A sequin for ornamenting an article of clothing or a clothing accessory, the sequin comprising:
- an output face and an attachment face oppositely directed from the output face;
- one or more lenses disposed on the output face;
- a graphic, wherein:
  - the one or more lenses are disposed on or over the graphic and are configured to output an image of at least portions of the graphic; and
  - the outputted image is an altered representation of the graphic and varies based on a viewing angle, wherein a first image is output along a first viewing angle and a second image is output along a second viewing angle; and
- an attachment feature configured to facilitate:
  - an attachment of the sequin to an article of clothing or a clothing accessory; and
  - a maintaining, at least in part, of an orientation where the attachment face is directed towards an attached article of clothing or an attached clothing accessory and the output face is directed away from an attached article of clothing or an attached clothing accessory.

8. The sequin of claim 7, wherein the one or more lenticular lenses are made of a transparent elastomer.

9. The article of clothing or the clothing accessory of claim 1, wherein each sequin in the array of sequins is disposed next to an adjacent sequin on the attached article of clothing or the attached clothing accessory without overlapping the adjacent sequin.

10. The article of clothing or the clothing accessory of claim 1, wherein:
- a first sequin of the plurality of sequins is adjacent to and partially overlapping a second sequin of the plurality of sequins, wherein:
  - a first portion of the first sequin overlaps a second portion of the second sequin;
  - a first sub-portion of said graphic portion of the first sequin is disposed on the first portion of the first sequin;
  - a second sub-portion of said graphic portion of the second sequin is disposed on the second portion of the second sequin; and
  - the first sub-portion of said graphic portion of the first sequin is the same as the second sub-portion of said graphic portion of the second sequin.

11. The article of clothing or the clothing accessory of claim 1, wherein said attachment feature of at least one sequin of the plurality of sequins comprises two slits wherein a strip of the at least one sequin is located between the two slits and is configured to receive a thread or yarn extending through the two slits.

12. The article of clothing or the clothing accessory of claim 1, wherein said attachment feature of at least one said sequin of the plurality of sequins comprises one or more notches extending along an edge from said top face to said bottom face, wherein the one or more notches are configured to provide rotational stability and assist in orienting the sequin.

13. The article of clothing or the clothing accessory of claim 1, wherein the one or more lenticular lenses and the interlaced graphic are configured to output auto-stereographic images and the first image and the second image are stereographic images.

14. The article of clothing or the clothing accessory of claim 1, wherein the outputted image is a third set of graphic interlacings output along a third viewing angle.

15. The article of clothing or the clothing accessory of claim 14, wherein each of said plurality of sequins outputs a portion of the third set of interlacings along a third viewing angle.

16. The sequin of claim 7, wherein a third image is output along a third viewing angle.

17. The sequin of claim 7, further comprising positioning information useable at least in part to identify a predetermined location of attachment to an article of clothing or a clothing accessory.

18. The sequin of claim 7, wherein the attachment feature is an aperture, wherein the aperture:
- passes from the output face to the attachment face; and
- is configured to receive a thread therethrough.

19. The sequin of claim 7, wherein the attachment feature of the sequin comprises two slits wherein a strip is located between the two slits and is configured to receive a thread extending through the two slits.

20. The sequin of claim 7, wherein the attachment feature of the sequin comprises one or more notches extending along an edge from the output face to the attachment face, wherein the one or more notches are configured to provide rotational stability and assist in orienting the sequin.

21. The sequin of claim 7, wherein the graphic is an interlaced graphic where first image elements are interlaced with second image elements and the first image output along the first viewing angle comprises the first image elements and the second image output along the second angle comprises the second image elements.

22. The sequin of claim 21, wherein the one or more lenses are lenticular lenses and the one or more lenticular lenses and the interlaced graphic are configured to output an auto-stereographic image and the first image and the second image are stereographic images.

* * * * *